US012620282B2

(12) United States Patent
Mitris

(10) Patent No.: US 12,620,282 B2
(45) Date of Patent: May 5, 2026

(54) KEY SAFE AND KEY ACCESS SYSTEMS

(71) Applicant: CONA INTERNATIONAL PTY LTD, Pearcedale (AU)

(72) Inventor: Constantine Mitris, Pearcedale (AU)

(73) Assignee: CONA INTERNATIONAL PTY LTD, Pearcedale (AU)

( * ) Notice: Subject to any disclaimer, the term of this patent is extended or adjusted under 35 U.S.C. 154(b) by 219 days.

(21) Appl. No.: 17/484,489

(22) Filed: Sep. 24, 2021

(65) Prior Publication Data

US 2022/0084338 A1 Mar. 17, 2022

Related U.S. Application Data

(63) Continuation of application No. PCT/AU2020/050289, filed on Mar. 26, 2020.

(30) Foreign Application Priority Data

Mar. 26, 2019 (AU) ................................ 2019901013
Aug. 9, 2019 (AU) ................................ 2019902864

(51) Int. Cl.
*G07C 9/00* (2020.01)
*G07C 9/21* (2020.01)

(52) U.S. Cl.
CPC ........... *G07C 9/00309* (2013.01); *G07C 9/21* (2020.01); *G07C 2009/00444* (2013.01)

(58) Field of Classification Search
CPC .................. G07C 9/00309; G07C 9/21; G07C 2009/00444
See application file for complete search history.

(56) References Cited

U.S. PATENT DOCUMENTS

| | | | | |
|---|---|---|---|---|
| 2006/0173750 | A1* | 8/2006 | Naley | G06Q 20/12 705/26.81 |
| 2015/0371470 | A1* | 12/2015 | Brown | H04L 63/061 340/5.61 |
| 2017/0024693 | A1* | 1/2017 | Wiechers | G06Q 10/0833 |
| 2018/0061165 | A1* | 3/2018 | Paye | G07C 9/28 |
| 2018/0158021 | A1 | 6/2018 | Dautz et al. | |
| 2018/0276481 | A1* | 9/2018 | Bourgeais | G07C 9/00896 |
| 2018/0322719 | A1 | 11/2018 | Jones et al. | |

(Continued)

FOREIGN PATENT DOCUMENTS

| | | | |
|---|---|---|---|
| EP | 3 410 410 | A1 | 12/2018 |
| JP | 2018-142193 | A | 9/2018 |
| WO | 2018/029593 | A1 | 2/2018 |

OTHER PUBLICATIONS

International Search Report issued by The Australian Patent Office for corresponding International Patent Application No. PCT/AU2020/050289, mailed on Jun. 24, 2020.

*Primary Examiner* — Nabil H Syed
(74) *Attorney, Agent, or Firm* — Myers Wolin, LLC

(57) ABSTRACT

A method and apparatus for use in aiding provision of services requiring access through a physical key including the steps of providing a plurality of compartments with a digital lock for receiving the physical key and including the step of transmitting to a user providing the service with one or more of a digital keycode, time access key, and identity tag. The digital lock is activatable to open the identified compartment by receipt through a sensor of digital keycode and time access key and comparison of the time access key with the clock.

9 Claims, 33 Drawing Sheets

(56) References Cited

U.S. PATENT DOCUMENTS

| | | | |
|---|---|---|---|
| 2018/0365640 A1 | 12/2018 | Simms et al. | |
| 2019/0180544 A1* | 6/2019 | Newcomb | E06B 7/32 |
| 2020/0027054 A1* | 1/2020 | Hall | G06Q 10/083 |
| 2021/0035063 A1* | 2/2021 | Cartwright | G07F 9/026 |

* cited by examiner

Figure 6A:
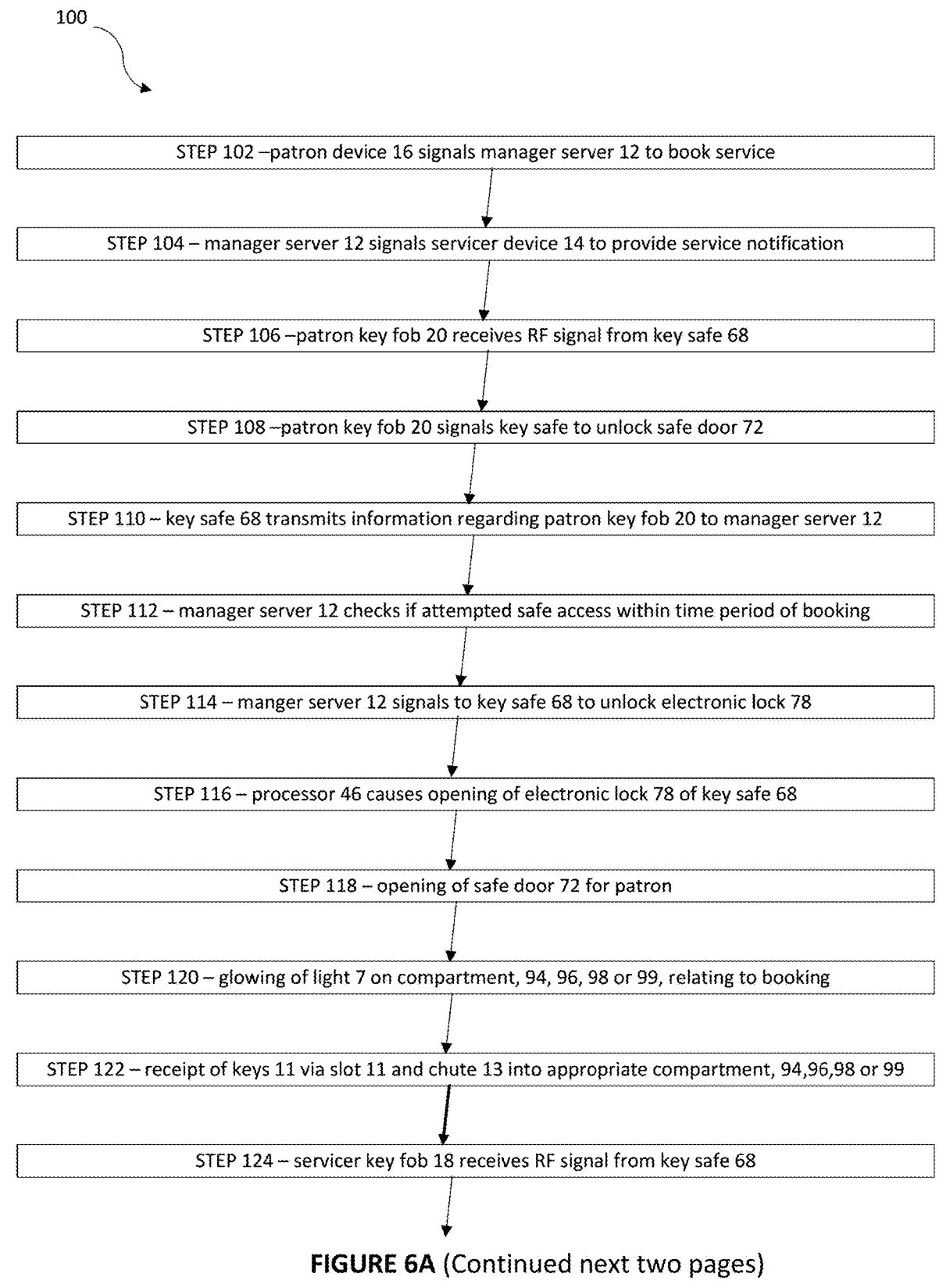

100

STEP 102 –patron device 16 signals manager server 12 to book service

STEP 104 – manager server 12 signals servicer device 14 to provide service notification STEP 106 –patron key fob 20 receives RF signal from key safe 68

STEP 108 –patron key fob 20 signals key safe to unlock safe door 72

STEP 110 – key safe 68 transmits information regarding patron key fob 20 to manager server 12

STEP 112 – manager server 12 checks if attempted safe access within time period of booking STEP 114 – manger server 12 signals to key safe 68 to unlock electronic lock 78

STEP 116 – processor 46 causes opening of electronic lock 78 of key safe 68

STEP 118 – opening of safe door 72 for patron

STEP 120 – glowing of light 7 on compartment, 94, 96, 98 or 99, relating to booking STEP 122 – receipt of keys 11 via slot 11 and chute 13 into appropriate compartment, 94,96,98 or 99

STEP 124 – servicer key fob 18 receives RF signal from key safe 68

FIGURE 6A (Continued next two pages)

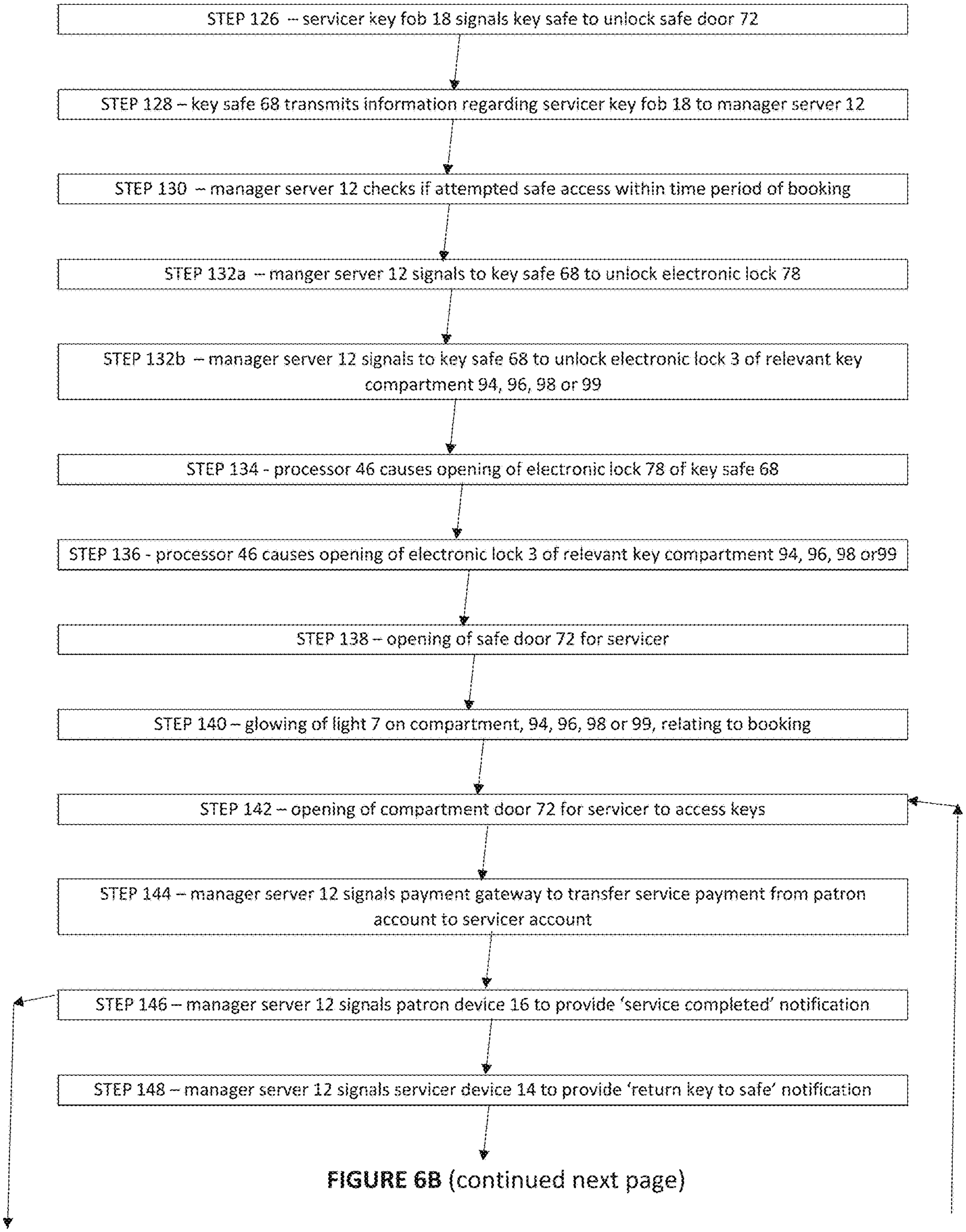
FIGURE 6B (continued next page)

My Profile

KEY SAFE AND KEY ACCESS SYSTEMS

CROSS-REFERENCE TO RELATED APPLICATIONS

This application is a continuation of International Patent Application No. PCT/AU2020/050289, filed Mar. 26, 2020, which claims priority from Australian Patent Applications Nos. 2019901013, filed Mar. 26, 2019 and 2019902864, filed Aug. 9, 2019, and these applications are incorporated herein by reference for all purposes as if fully set forth herein.

FIELD OF THE INVENTION

The present invention relates to key access systems and in particular to key safes and key access systems that include key safes.

The invention has been developed primarily for use in/with multi-tenanted apartment blocks and will be described hereinafter with reference to this application. However, it will be appreciated that the invention is not limited to this particular field of use.

The present invention relates to a method and system for providing a service to one or more individuals associated with an entity. The service may be any type of service. The entity may be a building corporation or body corporate. In an example, the service is a car washing and/or related car cleaning service. The individuals are tenants of an apartment block. The entity is therefore the owner of the apartment block or a body corporate representing the apartment block. The invention is not to be limited to use in this specific environment.

BACKGROUND

It is known to have key safes that include a mechanical or an electronic lock. However generally such safes are limited in use. Often this is overcome by use of master keys. However, this merely provides unlimited access to a greater number of people with no control over those people. The problems with this system can be seen by the problems incurred at hotels or motels where cleaning staff have unfettered access by use of master keys.

Clearly in complex locations such as privately-owned apartments in a block of apartments such ready access to any one with a master key is not acceptable. The problem is that there is individual control required to the access even if the person being provided access is a maintenance person for the entire block of apartments.

If the individuals were to have their individual control system, there is a resultant multitude of systems in the block of multiple apartments and a waste of space with the multitude of systems and confusion reigns in finding and accessing the right one with the right code or key.

It can be seen that a particular range of problems occur with known systems including one or more of:

a) Multiple safes are needed for multiple keys if there is to be control over access to one set only of the keys
b) There is no mechanism for controlling multiple access by multiple people;
c) There is no control of when access is allowed;
d) Generally, the authorising user must physically attend to the safe to insert the keys and provide access
e) Generally, the authorising user must physically attend to the safe to withdraw the keys to stop access; and
f) There is no manner of coordinating different users needing different keys without having different systems for each user and each set of keys.

Thus, it would be advantageous to provide a system, device and/or process which reduces, limits, overcomes, or ameliorates one or some of the problems, drawbacks, or disadvantages associated with the prior art, or at least provides an effective alternative.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and broad consistory statements herein.

SUMMARY

The invention provides in one embodiment a key access system for selectively providing access to first and second keys or sets of keys, the system comprising:

a) a key safe including:
b) a key safe door which when opened enables access into the safe;
c) an electronic lock for locking or unlocking the key safe door;
d) at least first and second key compartments for containing the first and second keys or sets of keys, and wherein each of said at least first and second key compartments includes a lockable compartment closure for selectively providing access to the compartment;
e) a remote communications module for sending and receiving data from remote locations by a telecommunication system including a starting access clock register for registering a defined starting time for access;
f) a localised communications module for sending and receiving data to and from external nearby wireless communications devices;
g) a request clock register for registering a time that access is requested to the localised communications module by the external nearby wireless communications devices;
h) a determinator for assessing or receiving data that selectively determines fulfilment of one or more of the predetermined access criteria including of:
i) selected compartment from the at least first and second key compartments; and
j) within the allowed timing of the request clock register from the starting access clock register;
k) wherein a first user can provide first and second keys or sets of keys and provide separate controlled access at controlled times to different secondary users using the same key access system.

In accordance with embodiments of the invention there is provided a method of controlling access to compartments including the steps of:

a) Providing multiple compartments
b) Providing a digital lock associated with each of the plurality of the multiple compartments;
c) Creating a digital key for each digital lock associated with one of the digital locks for one of the plurality of the multiple compartments;
d) Capturing the digital key;
e) Creating a time access key for allowed time limited operation of the digital lock for the digital lock associated with the one of the plurality of the multiple compartments;

f) Capturing the time access key;
g) Providing connection of the digital lock to a clock;
h) Wherein operative receipt of the digital key and the time access key within the allowed time with reference to the clock allows for opening of the one of the one of the plurality of the multiple compartments;

Also, embodiments of the invention provide a method of controlling access to keys including the steps of:

a) Providing multiple physical keys for different access requirements;
b) Providing multiple compartments for containing one or more physical keys;
c) Providing a digital lock on each of the plurality of the multiple compartments;
d) Creating a digital key for each digital lock associated with one of the digital locks for one of the plurality of the multiple compartments;
e) Capturing the digital key;
f) Creating an identity tag for identifying a physical key in an allocated one of the multiple compartments for containing one or more physical keys;
g) Capturing the identity tag;
h) Creating a time access key for allowed time limited operation of the digital lock for the digital lock associated with the one of the plurality of the multiple compartments;
i) Capturing the time access key;
j) Providing connection of the digital lock to a clock;
k) Wherein upon operative receipt of the identity tag and determined requirement of one of the physical keys at a required time to form the required physical key, the digital key and the time access key associated with the relevant one of the plurality of the multiple compartments is provided; and
l) wherein upon operative receipt of the digital key and the time access key within the allowed time with reference to the clock allows for opening of the one of the one of the plurality of the multiple compartments for access to the one of the physical keys.

In one embodiment the invention provides a method of providing services requiring access including the steps of:

a) Providing a plurality of compartments with a digital lock on each of the plurality of compartments for opening with a digital key and connection of the digital key and/or the digital lock to a clock;
b) Receiving a request for a service in a predefined time and providing an associated physical key in one of the plurality of compartments for use in providing the service;
c) Creating an identity tag of the physical key and the associated one of the plurality of compartments the physical key is inserted
d) a digital key for unlocking the digital lock of the associated compartment in which the physical key is inserted
e) a time access key for allowed time limited operation of the digital lock for the digital lock associated with the one of the plurality of the multiple compartments;
f) Providing a service provider with the digital key and the time access key for use at the plurality of compartments
g) Wherein the plurality of compartments is able to receive from the service provider the digital key and the time access key to allow opening of the one of the one of the plurality of the multiple compartments for access to the one of the physical keys during the allowed time limited operation of the digital lock for the digital lock associated with the one of the plurality of the multiple compartments.

In one embodiment, the invention provides a key access system for selectively providing access to first and second keys or sets of keys, the system comprising a key safe including a key safe door which when opened enables access into the safe; an electronic lock for locking or unlocking the key safe door; and at least first and second key compartments for containing the first and second keys or sets of keys, and wherein each of said at least first and second key compartments includes a lockable compartment closure for selectively providing access to the compartment.

The system further includes a remote communications module for sending and receiving data from remote locations by a telecommunication system including a starting access clock register for registering a defined starting time for access; a localised communications module for sending and receiving data to and from external nearby wireless communications devices; a request clock register for registering a time that access is requested to the localised communications module by the external nearby wireless communications devices; and a determinator for assessing or receiving data that selectively determines fulfilment of one or more of the predetermined access criteria including of selected compartment from the at least first and second key compartments; and within the allowed timing of the request clock register from the starting access clock register.

In this way a first user can provide first and second keys or sets of keys and provide separate controlled access at controlled times to different secondary users using the same key access system.

In some embodiments, the invention can provide a method for providing a service to one or more individuals associated with an entity using the key access system of the invention, the method comprising the steps of:

(a) receiving service booking and payment information from an individual accessing one or more terminals;
(b) transmitting the booking and payment information to a server for storage on a database;
(c) transmitting the booking information from the database on the server to one or more service terminals such that the service can be ascertained;
(d) attending a location associated with the entity and performing the booked service by service personnel who have been given service booking information from the one or more service terminals from the server;
(e) transmitting a confirmation from one or more service terminals to the server to indicate that the service has been completed;
(f) storing the confirmation to the database on the server; and
(g) informing the individual that the service has been completed.

In an example there are the additional steps of:

(h) the server calculating a payment, over a predetermined time period, to be paid to the entity based on one or more predetermined criteria; and
(i) transmitting the payment to the entity.

In an example, the entity is an owner's corporation or body corporate of an apartment building complex.

In accordance with another aspect of the present invention there is provided a system for providing a service to one or more individuals associated with an entity, the system including:

one or more terminals for receiving service booking and payment information from a user;

a service database for receiving service booking and payment information; one or more service terminals for receiving service booking information from the server such that the service can be completed and a confirmation to be sent back to the server and to the individual concerning completion of the service.

BRIEF DESCRIPTION OF THE DRAWINGS

In order that the invention can be more clearly understood and made into practical effect there shall now be described in detail embodiments in accordance with the invention. The ensuing description is given by way of non-limitative examples only and is with reference to the accompanying drawings, wherein:

FIGS. 6A, 6B and 6C is a connected flow diagram illustrating an embodiment of the invention of the process for operating a key safe.

DETAILED DESCRIPTION OF THE PREFERRED EMBODIMENTS

Figure 1:
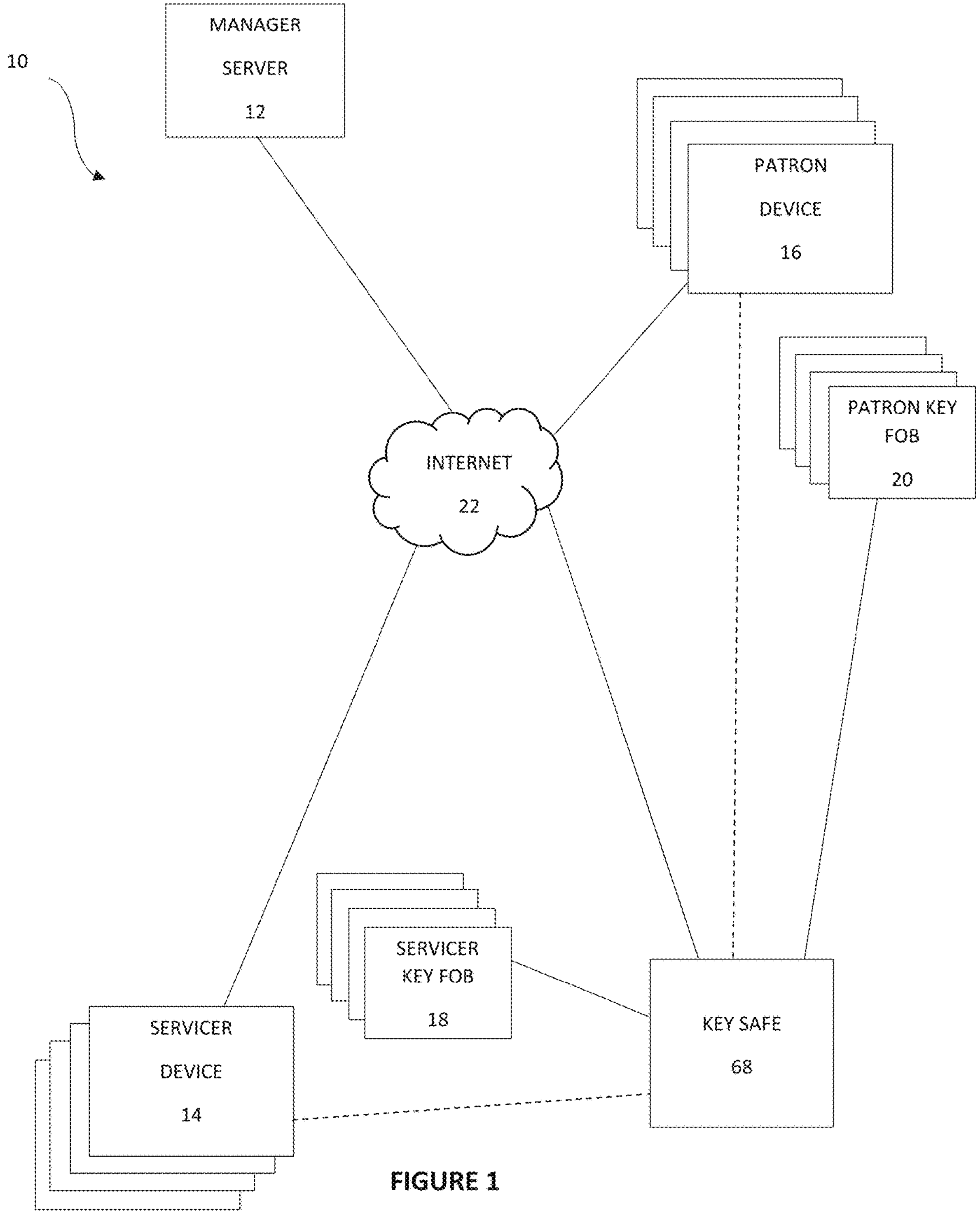
FIG. 1 is a block diagram of an example networked system that can be utilised to embody or implement aspects of the invention.

Referring to FIG. 1, there is shown an exemplary networked infrastructural key access system 10. The system 10 comprises multiple hardware devices linked by a telecommunication network.

In the embodiment shown, the hardware devices comprise various electronic, processing and/or computing devices including: a first device or linked devices comprising a manager server 12, a second device or linked devices comprising a servicer device 14 such as a mobile phone, a third device or linked devices comprising a patron device 16 such as a mobile phone, a fourth device or linked devices comprising a servicer key fob 18, a fifth device or linked devices comprising a patron key fob 20, and a sixth device or linked devices comprising a key safe 68.

The manager server 12, servicer device 14, patron device 16, and key safe 68, are each connectable with each other, via the internet 22.

Additionally, the servicer and patron key fobs, 18 and 20 respectively, are configured to communicate directly with the key safe 68 in the key access system shown.

The network of the key access system 10 comprises the internet 22, and can further include other networks such as WAN, Ethernet, token ring, satellite communications networks, telecommunications networks, including mobile telephone networks such as GSM or 3G networks, etc., or any combination thereof, by which the hardware devices can communicate. This enables, for instance, input and output data to be communicated via the network between the hardware devices. In the embodiment shown, the servicer key fob 18 and patron key fob 20 are configured to communicate directly with the key safe 68 via a radio waves suitable for RFID.

Interconnections between devices facilitating transfer of data and/or information over the network can be wholly or partially wired, for example by optical fibre, and/or wireless, for example by utilising Wi-Fi, Bluetooth, cellular, or satellite communications networks. In this instance, connections between hardware devices via the internet rely on wired and wireless technologies, including optical fibre and Wi-Fi, and the direct connection between the key fob 18, 20 and the key safe 68 can be wireless via an RFID network.

It is to be appreciated that the system 10 can additionally, or alternatively, include other electronic or computing devices, such as one or more desktop computers, laptop computers, tablets, implanted devices, smart phones and/or wearable devices such as smartwatches and headsets.

It is to be appreciated that the networked infrastructural system 10 represents only a single example of infrastructure which can be suitable for implementing aspects of the invention. Other suitable networked systems for implementing the invention can involve various alternative devices, configurations, networks, or architectures without departing from the scope of the present invention.

Figure 2:
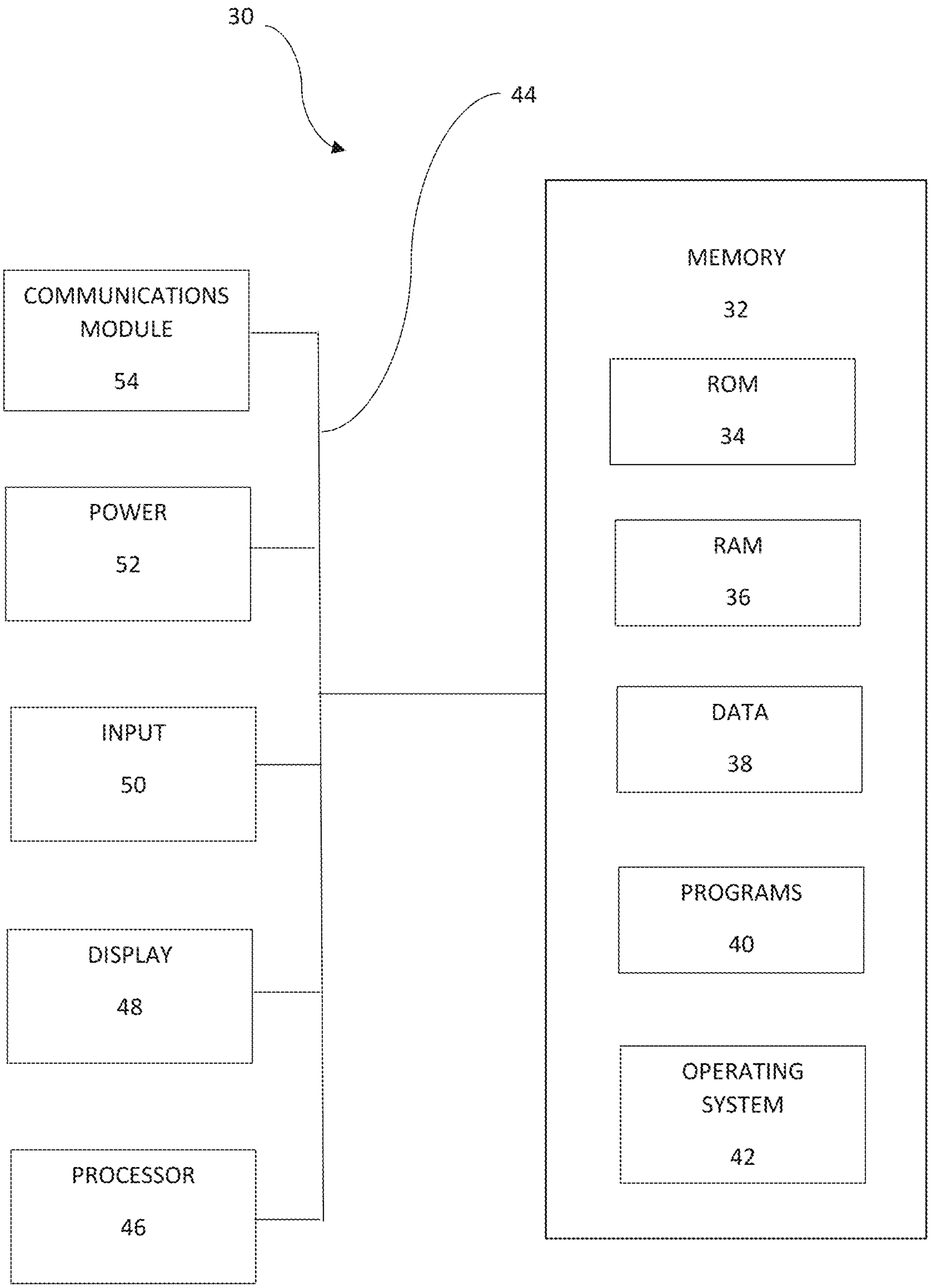
FIG. 2 is a block diagram illustrating components of the example system of FIG. 1.

Referring now to FIG. 2, there is shown a block diagram of computing hardware, generally designated 30, associated with the key access system 10. Some or all of the hardware 30 is associated with potentially any or each of the electronic devices 12, 14, 16, 18, 20 and 68. The hardware 30 includes memory 32 which includes ROM 34 and RAM 36, as well as stored data 38, collections of instructions forming programs and applications 40, and an operating system 42. A bus 44 links the memory 32 to a processor 46, display 48, and input means 50. The hardware is powered by a power supply 52. A communications interface 54 enables the device to communicate with other devices.

Figure 3:
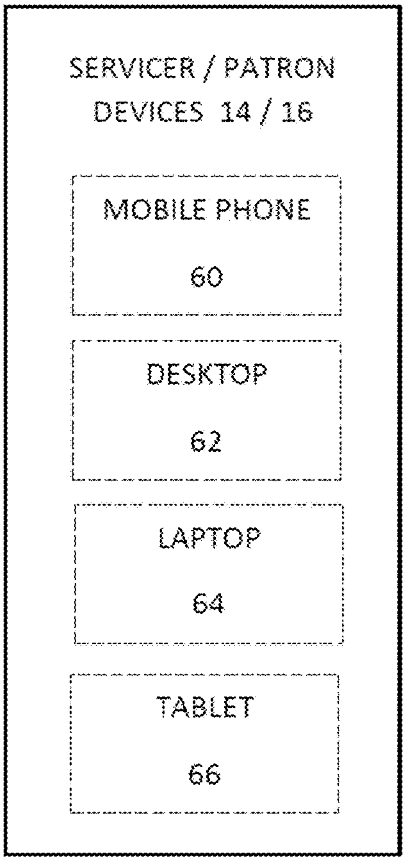
FIG. 3 is a block diagram illustrating various example forms of servicer and patron devices of the system of FIG. 1.

Referring to FIG. 3, the servicer and patron devices, 14 and 16 respectively, can be personal computing devices that comprise any one or more of a mobile phone 60, desktop computer 62, laptop computer 64 and tablet 66, depending on user preference and accessibility. Each of these devices (as well as the servers 12 and the key safe 68) comprises some or all of the hardware 30 in various forms. For instance, in an embodiment where the servicer device 14 and/or patron device 16 is in the form of a desktop computer 62, it can include a memory 32, a processor 46, a display 48 in the form of a monitor, an input 50 in the form of a mouse and keyboard, a power supply 52 in the form of a power supply unit which converts mains AC to low-voltage regulated DC power, and a communications interface 54 which includes an ethernet port for wired network connectivity. As another example, in this embodiment where the servicer device 14 and patron device 16 comprise a mobile phone 60, the mobile phone 60 can include a memory 32, a processor 46, a display 48 and an input 50 together in the form of a touchscreen, a power supply 52 in the form of an internal DC rechargeable battery, a communications interface 54 which includes a Wi-Fi adapter for wireless network connectivity, and a GSM module for communicating over the GSM network.

Figure 4:
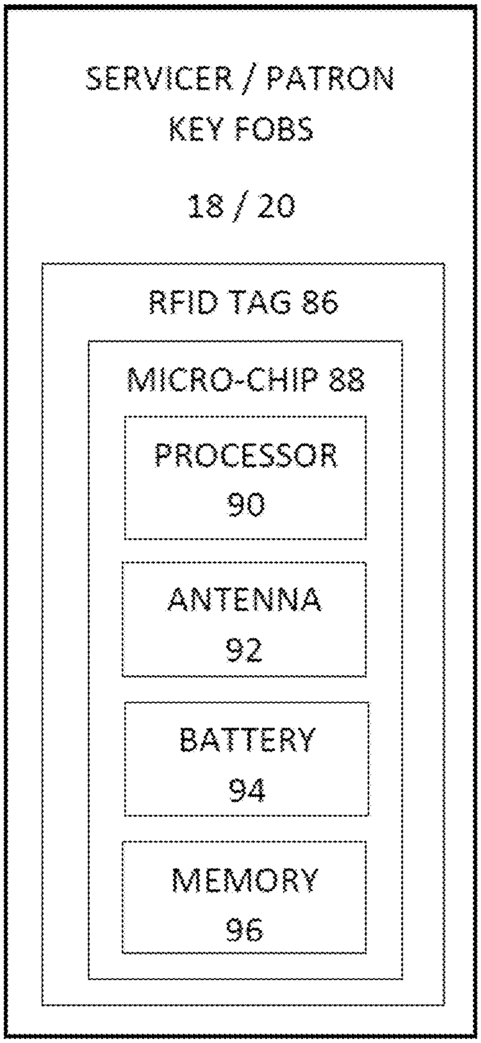
FIG. 4 is a block diagram illustrating elements of example servicer and patron key fobs of the system of FIG. 1.

Referring to FIG. 4, each of the servicer and patron key fobs, 18 and 20 respectively, comprises an RFID tag having a microchip 88 that includes a microprocessor 90, antenna 92, battery 94 and memory 96.

Figure 5:
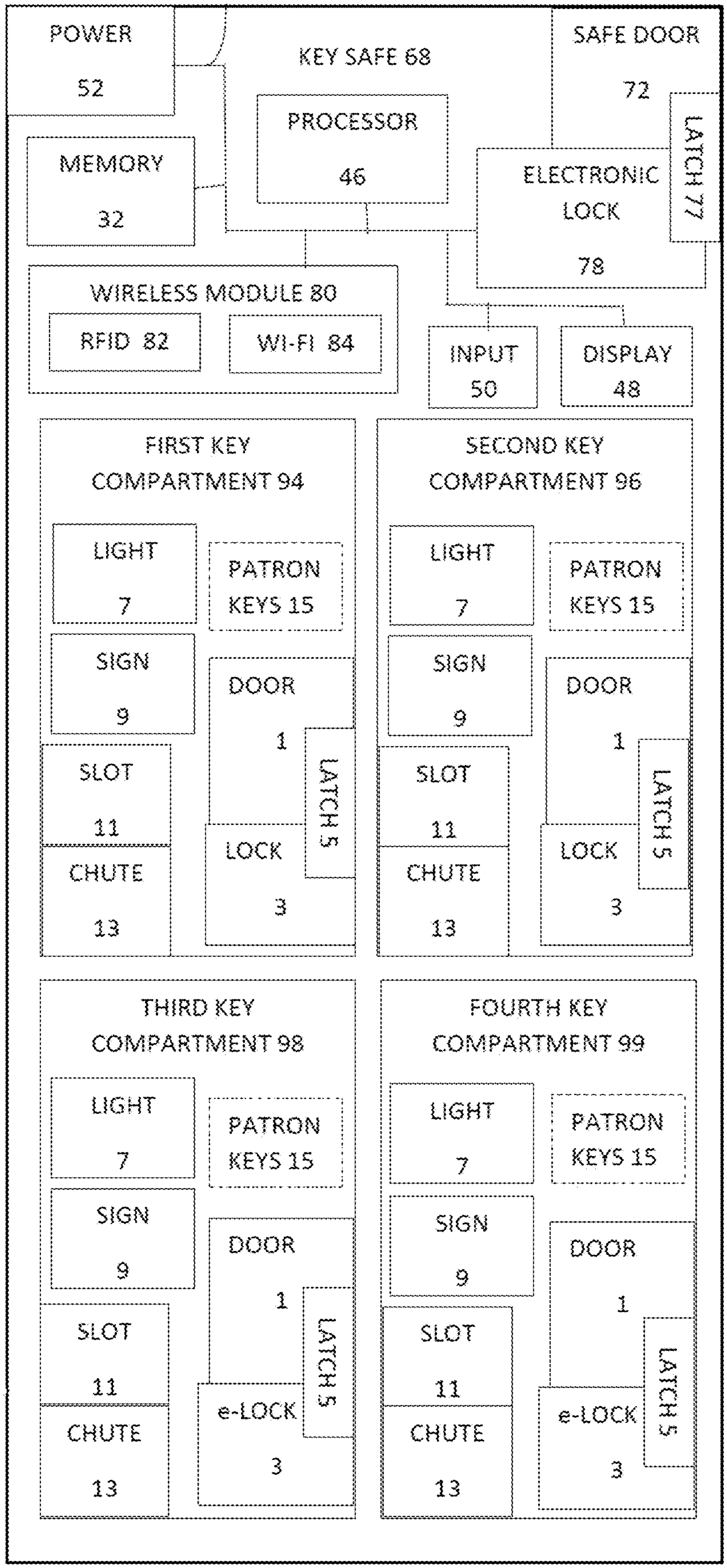
FIG. 5 is a block diagram illustrating elements of an example key safe of the system of FIG. 1.

Referring to FIG. 5, there is shown the key safe 68 having a wall 70 and a door 72 and comprising first, second, third and fourth compartments, 94, 96, 98, and 99 respectively, each compartment defining a slot 11 that can be accessed by hand when the key safe door 72 is opened. The safe comprises some or all of the aforementioned hardware 30 in various forms, including power module 52 in the form of a power supply unit, processor 46, memory 32, wireless communications module 80 comprising a Wi-Fi module 84 and an RFID module 82 adapted for communication with the RFID tags 86 of the key fobs 18,20, user input 50 in the form of a key pad, display screen 48, and additionally an electronic lock 78 comprising a magnetic latch 77, the electronic lock 78 being configured to lock or unlock the key safe door 72.

Users

The primary user is a person that wishes to use the services provided by a servicer (service provider). That primary user is considered to be a patron and has connection to the key access system by use of a downloadable app on the patron device 16. This patron device allows the patron to set and control the access to the keys.

The patron also has the power to set the timing of the access.

In essence the patron can be an owner of an apartment in a block of apartments and be able to readily independently control various trades people to access their apartment at and according to the patron's wishes. Further the patron can control the order of access and not need to merely give a single access to all trades people. Instead the multi-system allows coordinated separate control to separate trades people.

Other than trades people can be allowed to have coordinated access and controlled such as deliveries etc.

The following description outlines an example of the system and method for use of the key access system to individuals which are residents of an entity such as a building complex which is controlled by a body corporate or similar. The system and the method utilise a number of user terminals connected to a network (which can be a LAN, WAN or the Internet) which all operate via a website, and one or more service personnel terminals. The system can be configured to operate on a 3G or 4G or similar mobile telephone network.

The system includes a number of individual users which correspond to owners of cars or apartments who live within one or more apartments or buildings in which the service is provided. The building is therefore associated with an entity which can be a body corporate for example. The users can interact with the system directly or the users can interact with the system indirectly via one or more terminals.

In this case, the user individual being the tenant or owner of a particular apartment within the building would make a request for a service through the system or through the network. This can be accessing a web site from an individual's computer device. The network, such as the Internet, can be accessible via a terminal such as a PC Laptop or the like, or a mobile communication device. Also connected to the network is a booking and payment service which includes a database for storing information received from user individuals.

The information stored can include personal data information and other particulars. It can also include booking data information for services that have been performed and for services that are to be performed. A number of personnel that will provide the services, have access into the network to obtain information about future bookings and to provide information when a service has been performed. Each terminal can include one or more of a mobile telephone, a computer terminal, a laptop or a portable digital assistant or the like. The database is connected with the booking and payment servicer and is configured to store information received from the car wash terminals concerning the service performed, such as when the service has been completed.

The booking and payment server is also connecting to a banking server which can be associated with a banking institution for transferring payment funds as will be described hereinafter. Connected to the banking server are one or more accounts which correspond to bank accounts associated with the entities such as the owners corporation, body corporate, and also individual's accounts.

A basic functional flow diagram of process steps in the system has a customer front end block, a customer area, a server personnel area, and an administration area, and a banking interface. A customer of the system being an individual will access a booking process by a user or accessing the system via a telephone, mobile communication device, computer terminal or the like. Alternatively, the individual can have a card which can be swiped which contains all the information to identify the individual.

Accordingly, when a user individual accesses the customer front end, the process is commenced. The individual, if registered in the system, then logs in and proceeds to the customer area. Alternatively, if the individual is not a registered user then the user is diverted to a registration process which comprises a register activation section where data concerning the individual is entered. When the registration has been completed, an individual is issued with an identification number. The processes in the customer front end can include other detailed steps in order to check validity of the individual, lost passwords and the like.

Once the individual has completed processing through the customer front end, they are transferred to a customer area and presented with a dashboard. The individual then proceeds to set up a schedule. The schedule step requires identifying the location, the type of service required, and the time and date of service.

Once the initial setup have completed, the individual is taken to a payment step. Here, there is a bank interface where there can be debiting of the individual's bank account credit card, or similar.

Once the payment has been transacted, then the banking interface provides a confirmation to the administration area in the database. When the individual has completed the schedule, data is sent to the administration area so that when the payment is approved by the banking interface there can be matching of a payment for the booking made.

Once the payment has been made, the user is provided with a receipt number for the booking. The system then passes data to the service personnel area. Thus, when service personnel login to the system there will be a display of individual's bookings. The service personnel can then check for customer/individual appointments and the actual service can then be assigned to the service personnel.

Once the service task is completed the service personnel enter completion and a message is then dispatched to the individual confirming that the service has been completed. At the completion step, an indication can be dispatched to the administration area so that completion of the service is recorded in the database. Returning now to process steps within the customer area, it should be noted that when the customer/individual is provided with a confirmation receipt number, they are requested to place their keys in the secure repository. This repository can be at a desk or at an area designated for the services to be performed such as in a common area of the building complex. The secure repository comprises the key lock system of the invention. Other forms of security repositories can be provided if desired and the locked box is just one example.

The service personnel have access to the secure repository such as by using a key of being identified by the order to retrieve the relevant keys. When the individual registers in the system and provided with an identification number, the individual can be issued with a key ring and tag with that identification number imprinted therein. The individual can use that key ring for the keys so that when the keys are dropped in the secure repository into primary and secondary containers, the service personnel can determine which keys are matched to which car or apartment. In that way, the service personnel can identify particular keys from a large number of such keys that can be in the secure repository.

When the service personnel have collected the keys, they can locate the car or apartment and the booked service can be performed. When the service has been completed the service personnel can then return the keys to the key safe box of the individual in the apartment complex. In that way, the individual can retrieve their keys from a further secure repository dedicated for their use only. This is identified in detail following.

In the bank interface there are a number of possible process steps. When a payment is to be made, the banking interface block can attribute a portion of the fee to be charged to, for example, a building fund and or a percentage to a corporate head or body corporate and/or to a charity fund.

In addition, a component of the fee for the service can include a component to cover costs associated with rental of the necessary service area in the apartment block required to perform the services.

Accordingly, process steps for this nature can be incorporated within the banking interface. The banking interface can also include details of a system coordinators bank account so the system coordinator (the owner of the system and controlling the whole system) can receive payments. The payment can be transacted and confirmed online and provided into the administration area.

Method of Operation

Figure 6C:
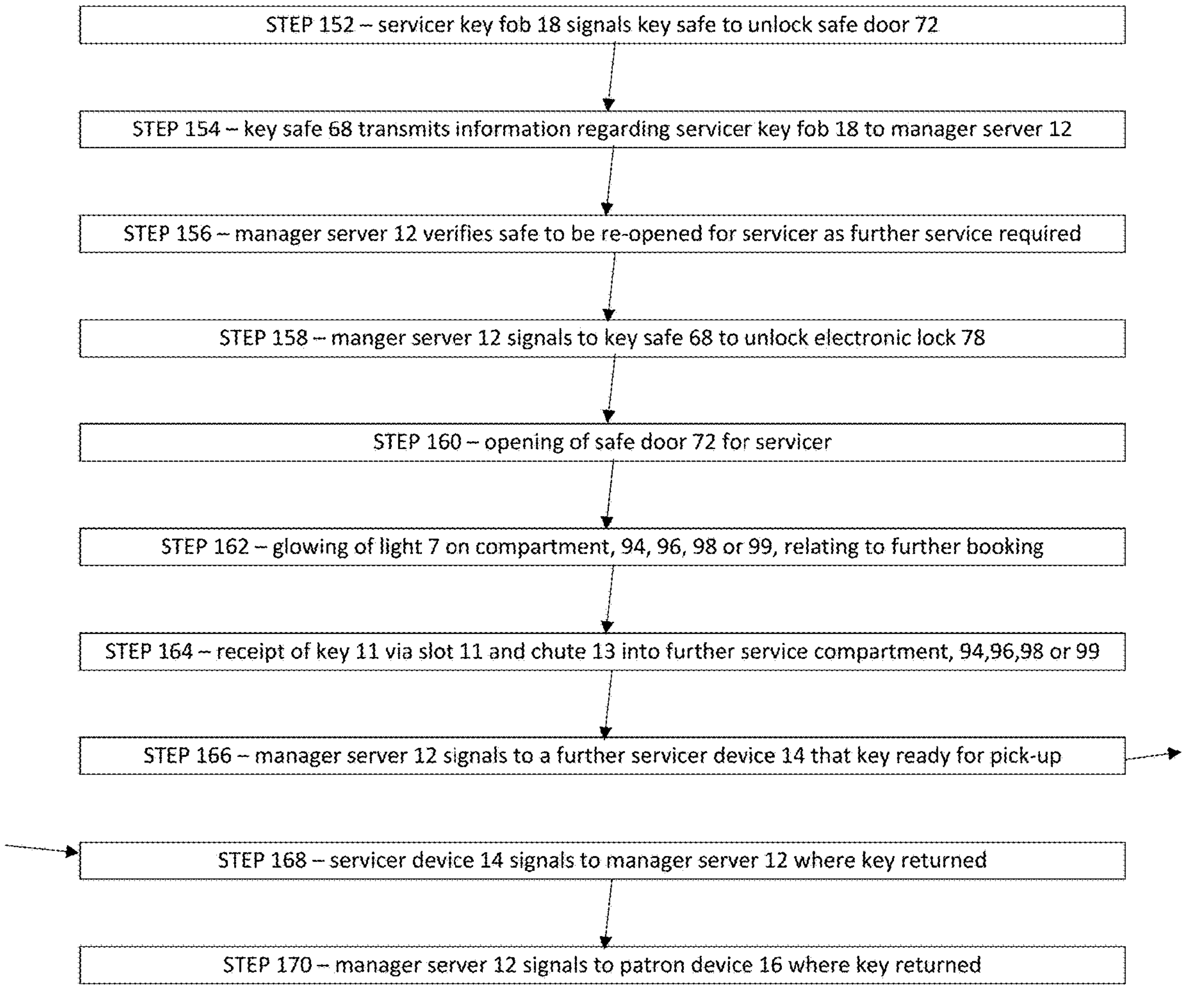

Referring to FIGS. 6A, 6B and 6C there is shown an example process 100 for storing and accessing keys in a key safe 68. In the example embodiment, a servicer, who operates the servicer device 14, is an individual offering a service such as an apartment clean or car wash, while a patron, who operates the patron device 16, is a patron of a dwelling such as a high-rise apartments or low-rise apartment blocks. The manager server 12 is operated by the system manager, who can, in addition to managing software for the system, sell or lease key safes 68 to the manager of the apartment blocks or other dwelling.

Thus, at step 102, a patron uses a previously downloaded key safe application on their patron device 14 (which in the example embodiment is a smart phone or tablet) to book a service such as apartment cleaning, grocery delivery, car wash, and/or dry cleaning. Booking of the service results in the patron device 14 wirelessly signally to the manager server 12 to record the service booking.

At step 104, the manager server 12 signals to the servicer device 14 (which in the example embodiment is a smart phone tablet) of a servicer who provides the booked service, notifying the servicer of the booking.

At step 106, the patron holds or swipes their patron key fob 20 (which can be in the form of, for example, a key card or item on a key ring) near the key safe 68. When close enough, the antenna 92 receives a radio frequency signal transmitted from the RFID module 82 of the key safe.

At step 108, on receiving the RF signal, the patron key fob 20 signals back to the RFID module 82 to unlock the key safe 68.

At step 110, the key safe 68, via its Wi-Fi module 84, transmits information regarding the patron key fob 20 to manager server 12.

At step 112, the manager server 12 checks whether the patron key fob 20 is attempting to unlock the safe within a predetermined time period prior to the patron's booking (e.g. on the day of service, up to 7.5 hours prior).

If within the predetermined time period, at step 114, the manager server 12 signals to the key safe 68 to unlock the electronic lock 78.

At step 116, as a result of the signal received from the manager server 12 by the safe's Wi-Fi 84 module, the processor 46 of the key safe 68 causes opening of the safe's electronic lock 78.

At step 118, with the electronic lock 78 unlocked, the patron is then able to open the key safe door or opening of the key safe door can be automated.

At step 120, a light 7 illuminates on the key compartment 94, 96, 98 or 99, relevant to the patron's booking, as identified by the sign 9 on the key compartment. For instance, the first key compartment 94 can be reserved for apartment keys to be used to access the patron's apartment in order to provide an apartment service, while the second key compartment 96 can be reserved for car keys to be used to access the patron's car to provide a car service, the third key compartment 98 can be reserved for apartment keys to be used to access the patron's apartment to deliver groceries, and the fourth key compartment 99 can be reserved for apartment keys used to access the patron's apartment to obtain garments for dry cleaning/ironing and/or deliver garments following dry cleaning/ironing. The sign 9 on the key compartment will indicate the particular service provided e.g. apartment keys for dry cleaning.

At step 122, the patron places their key into the slot 11 of the compartment with light 7 glowing and sign 9 indicating service booked. The keys pass through the slot 11 and down a chute 13 into the compartment where it is inaccessible by hand while the compartment door 1 is locked.

At step 124, the servicer holds or swipes their servicer key fob 18 (which can be in the form of, for example, a key card or item on a key ring) near the key safe 68. When close enough, the antenna 92 receives a radio frequency signal transmitted from the RFID module 82 of the key safe.

At step 126, on receiving the RF signal, the servicer key fob 18 signals back to the RFID module 82 to unlock the key safe 68.

At step 128, the key safe 68, via its Wi-Fi module 84, transmits information regarding servicer key fob 18 to the manager server 12.

At step 130, the manager server 12 checks whether the servicer key fob 20 is attempting to unlock the safe within a predetermined time period of the patron's booking (e.g. on the day of service, up to 4 hours before or after).

If within predetermined time period, at step 132, the manager server 12 signals to the key safe 68 to unlock both the electronic lock 78 of the key safe 68 (step 132*a*), and the electronic lock 3 of the key compartment 94, 96, 98 or 99 (step 132*b*) relevant to the patron's booking.

At step 134, as a result of the signal received from the manager server 12 by the safe's Wi-Fi 84 module, the processor 46 of the key safe 68 causes opening of the safe's electronic lock 78.

Additionally, at step 136, as a further result of the signal received from the manager server 12 by the safe's Wi-Fi 84 module, the processor 46 of the key safe 68 causes opening of the relevant compartment's electronic lock 3.

At step 138, with the electronic lock 78 of the key safe unlocked, the servicer is then able to open the key safe door or opening of the key safe door can be automated.

At step 140, a light 7 illuminates on the key compartment 94, 96, 98 or 99, relevant to the patron's booking, as identified by the sign 9 on the key compartment.

At step 142, with the electronic lock 3 of the relevant compartment unlocked, the servicer is then able to open the relevant compartment door (or opening of the compartment door can be automated) and reach in to grab the patron's keys in order to carry out the service.

At step 144, once the service has been performed, the servicer uses their servicer device to signal to the manager server that the service has been completed.

At step 146, the manager server 12 signals a payment gateway to transfer payment from an account for the patron to an account for the server, according to the service performed.

At step 146, the manager server 12 signals to the patron device 16, notifying the patron that their booking has been completed.

If this is the final service to be performed using a particular key on the day, the key is returned by the servicer to, for instance, the patron's apartment or letterbox.

At step 168, the servicer then uses their servicer device 14 to signal to the manager server 12 that or where the keys have been returned.

At step 170, the manager server 12 signals to the patron device 16 that or where the keys have been returned.

If, however, this is not the final service to be performed using a particular key on the day, the servicer does not yet return the key to the patron, and steps 168 and 170 are yet to be completed.

For example, where a single patron makes multiple different service bookings on the same day that require access to the same key, such as where the patron books both an apartment clean and a dry clean, each of which requires a different servicer to use the patron's apartment key to access their apartment, the servicer who completes the first booking is to return the keys to the key safe (rather than the patron), but into a different compartment that is accessible by the next servicer. This can occur as follows:

At step 148, the manager server 12 signals to the servicer device 14 that the key is to be returned to the key safe 68 for a further service.

At step 150, the servicer holds or swipes their servicer key fob 18 near the key safe 68. When close enough, the antenna 92 receives a radio frequency signal transmitted from the RFID module 82 of the key safe.

At step 152, on receiving the RF signal, the servicer key fob 18 signals back to the RFID module 82 to unlock the key safe 68.

At step 154, the key safe 68, via its Wi-Fi module 84, transmits information regarding servicer key fob 18 to the manager server 12.

At step 156, the manager server 12 verifies that the safe is to be re-opened for the servicer to allow storage of the key for collection by a further servicer.

At step 158, the manager server 12 signals to the key safe 68 to unlock the electronic lock 78 of the key safe 68.

At step 160, with the electronic lock 78 of the key safe unlocked, the servicer is then able to open the key safe door or opening of the key safe door can be automated.

At step 162, a light 7 illuminates on the key compartment, 94, 96, 98 or 99, relevant to the patron's next booking, as identified by the sign 9 on the key compartment.

At step 164, the servicer places the patron's key into the slot 11 of the compartment with light 7 glowing and sign 9 matching the further service booked. The key passes through the slot 11 and down the chute 13 into the relevant compartment where it is inaccessible by hand while the compartment door 1 is locked.

At step 166, the manager server signals to a further servicer device 14 that the key is ready for pick up by the further servicer.

From this point, the further servicer, who is required to carry out the patron's next booking, accesses the key in the same fashion as the previous servicer, with steps 124 to 144 being completed. If this is the final service to be performed on the day using the same key, steps 168 and 170 are then completed.

In another example system, the servicer device 14 acts also as the servicer key fob 18, and the patron device 16 acts also as the patron key fob 20.

Example 2

Referring to FIGS. 8 to 13, Users can select different types of services from the webpage 160 or through a native phone app. In a particular service such as cleaning there can be a plurality of possible providers 152, 153, 154 and one can be selected by a user 150 and notified to an administrator/agency 151.

Information given will be saved to a secure server and credit card info will be sent securely to Stripe in exchange for a security token which then will be used to render payments.

However, a user 150 must then be able to provide to the service provider a key for access. Instead of having to be onsite for the service to occur the user can use the access-controlled system of the invention. After completing the fields/information required, the user 150 needs to prepare the key to put in the locker (one of the multiple compartments 161, 162, 163 . . . ). Server will send a message containing the Deposit Key QR code. This forms the identity tag 173.

The User must put the device 152 (cellphone) displaying the QR code received in front of the QR reader 167 located within the key locker 160. The next available slot 161, 162, 163 . . . on the locker 160 will open.

The user 150 must then place the key 155 into the locker 161 and close it for the process to be completed. The locker 160 will send information to the server about the key's location, type of key (Apartment/Vehicle) and the owner of the key (identity tag 173).

Admin/Agency will see any completed key deposit and schedules of any services. Admin/Agency will select the next cleaner available for the job Cleaner selected 152 will receive the next schedule and the pair of QR code keys 181, 182 to get and return the key. QR Code keys can be only used at the schedule the User specifies and can be only used once.

The Cleaner must put the device 166 (cellphone) displaying the withdraw key QR code 181 received in front of the QR reader 167 located within the key locker 160. The correct slot 161 on the locker 160 will open.

Cleaner 152 gets the key 155 and proceeds to the location from the message received to do the cleaning service. The server is updated with the status of the key's location/handler. After the cleaning service, the cleaner 152 will return the key using the deposit key QR code 182 received from the message. The Cleaner 152 must put the device 166 (cellphone) displaying the Deposit QR code 182 received in front of the QR reader 167 located within the key locker. The next available slot 161, 162, 163 . . . on the locker will open for the cleaner to deposit the key. This does not have to be the same locker as originally used. Cleaner must close the locker to be able to complete the transaction and the locker will update the server, then the server will collect the payment from the user's Stripe token to collect payment and sends a message to both User and Admin/Agency.

User can request to get the key returned by the cleaner or leave it in the locker for the next service needed. That is the deposit key QR code 182 can be adapted to form the new identity tag 173 for the next service.

Referring to FIGS. 14 to 18 there can be seen the components of the system.

Figure 14:
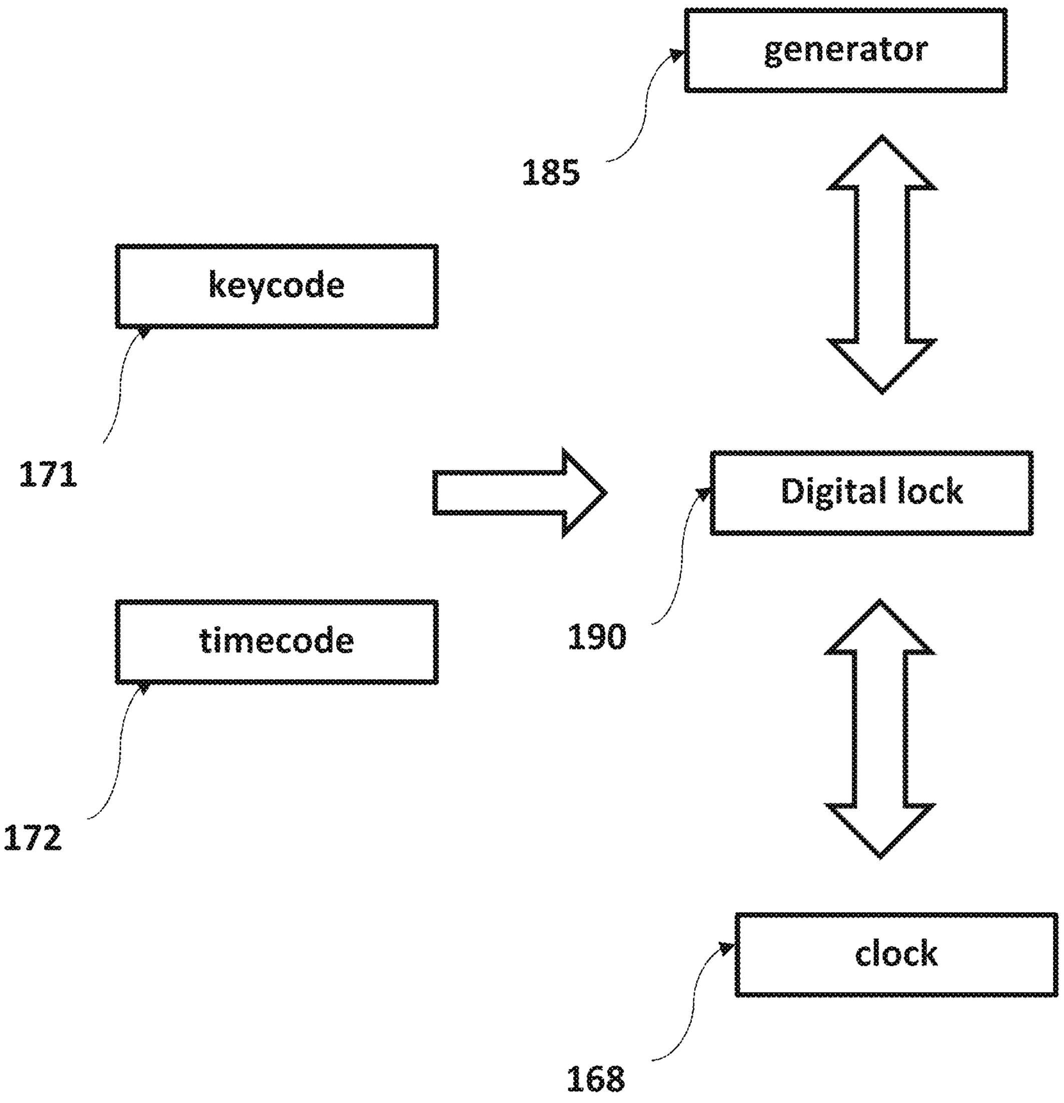
FIG. 14 is a diagrammatic view of an operational control of the digital lock comprising timecode and keycode for use on the multiple compartments of FIGS. 8 and 9.

Referring to FIG. 14, the access to the compartments 161, 162, 163 . . . is by way of a digital lock associated with the compartment. However for flexibility of use and ability to not be restrained by each compartment only being for a single user the digital lock is created each time it is in use. Therefore, a generator 185 is provided to create the digital lock 190.

However, the digital lock cannot be opened by a simple keycode. Instead there are multiple requirements of a keycode 171 and a timecode 172 which can be individually and separately generated in response to the same or different people. In particular the timecode can be defined by the user to provide a particular access time. Therefore, the digital lock 190 cannot be opened simply by a keycode 171 but must also receive the timecode. The digital lock cannot open without these two but also not without referring to a clock 168 connected thereto to see if the defined time period of the timecode 172 is fulfilled. Only with all of these actions completed will the digital lock 190 open and provide access to the designated compartment. Another important element is that these keycode 171 and timecode 172 are digital and therefore can be transmitted digitally to the required user and read digitally by a reader on the compartments. A preferred means of transfer is the QR code system, but other digital systems can be used.

Figure 15:
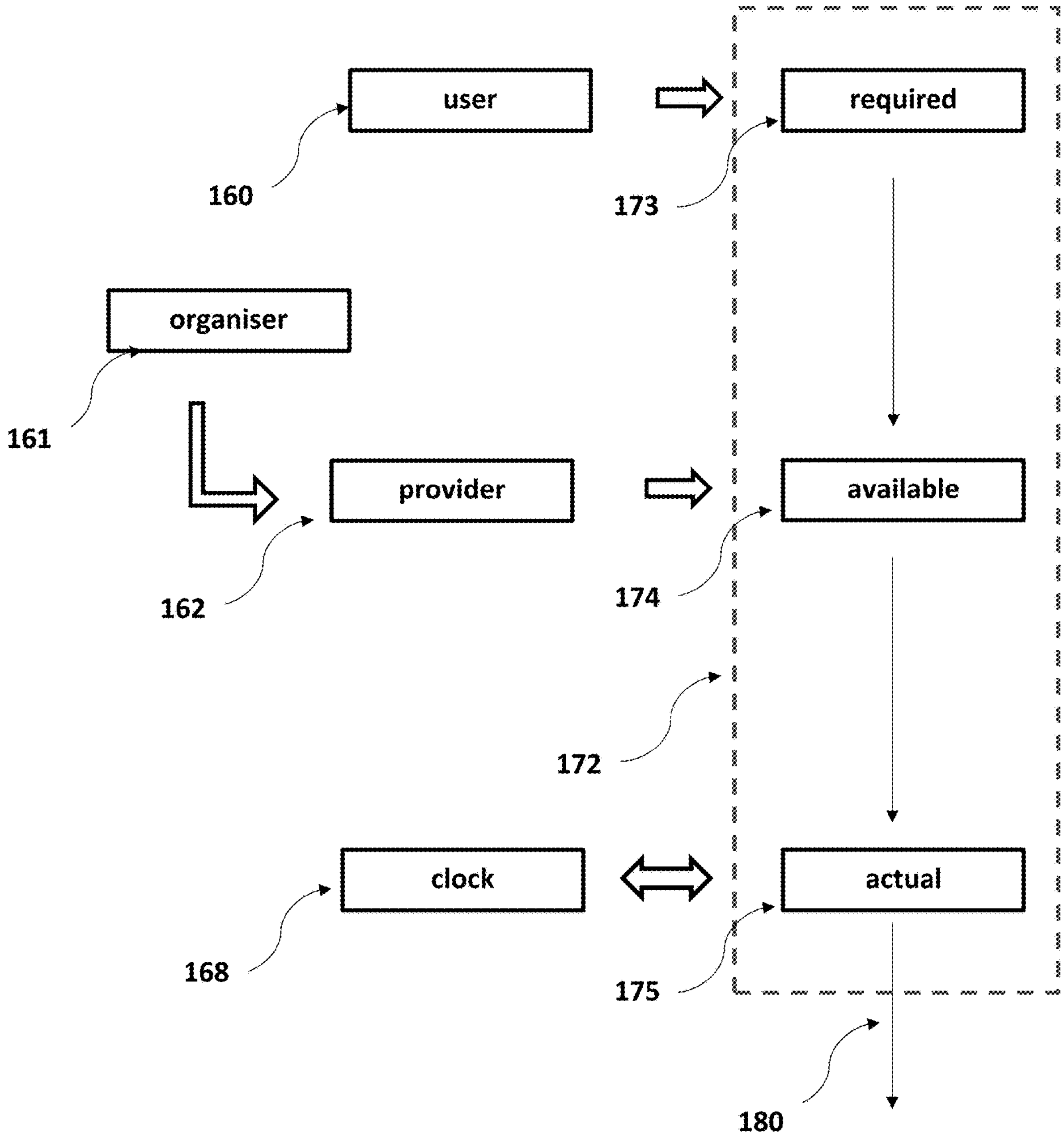
FIG. 15 is a diagrammatic view of an operational control of the timecode operation of the digital lock for use on the multiple compartments of FIGS. 8 and 9.

In FIG. 15 there is shown the creation of the various elements of the timecode 172. The user 160 can define the required time 173 for a service to be provided and thereby provide a range of time. The organiser 161 that is allocating the provider 162 of the service such as the cleaner 152 can define the available time 174 that the provider can provide the service and modify or restrict the timecode 172. This timecode can only be used when the timecode check part 175 reviews a connected clock 168 for the actual time and only then the timecode 172 provides an output 180 that with the keycode 171 can open the digital lock 190.

Figure 16:
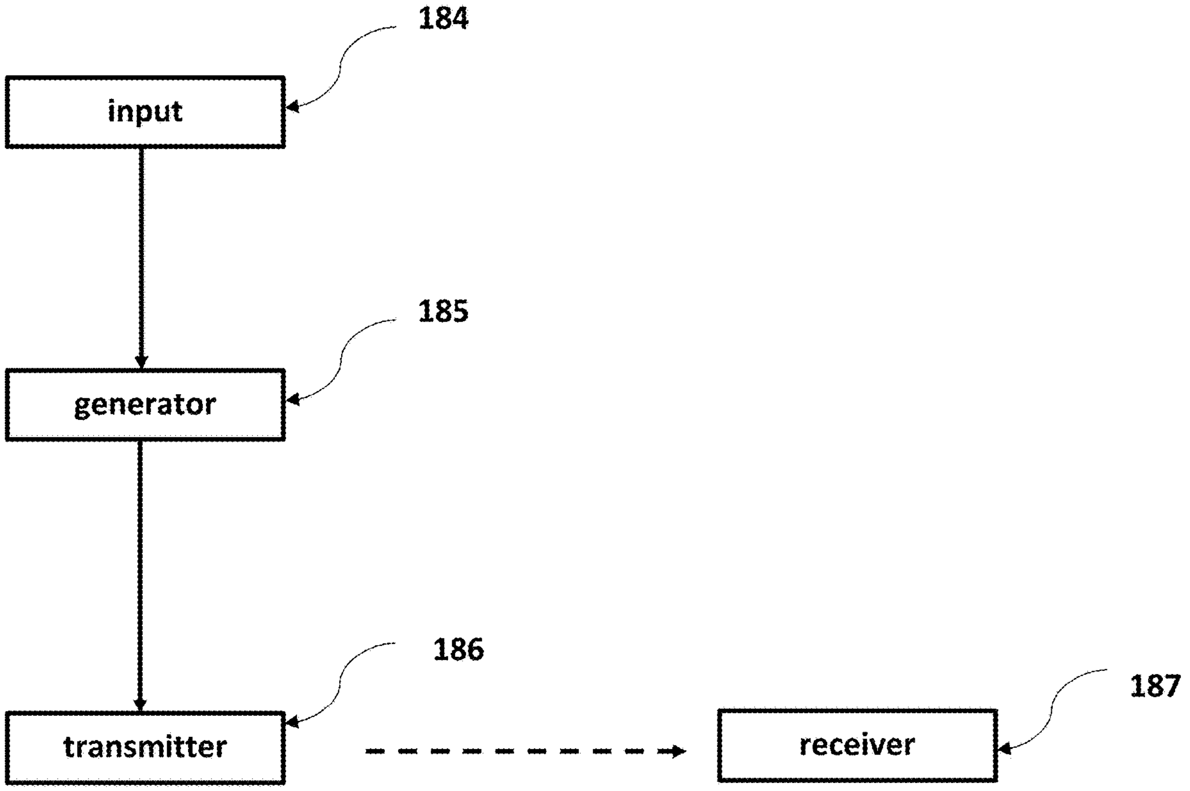
FIG. 16 is a diagrammatic view of an operational control of the transfer of the keycode of the digital lock for use on the multiple compartments of FIGS. 8 and 9.

As shown in FIG. 16 the keycode can begin with a request input 184 so that the generator 185 can create the keycode. This keycode is created in digital form such as in QR code so that it can be sent by a transmitter 186 wirelessly to a receiver 187. Such receivers can be the service provider's device 166 that has a screen that can visually display the QR code which can be placed in front of a QR reader 167 on the compartments 160.

Figure 7:
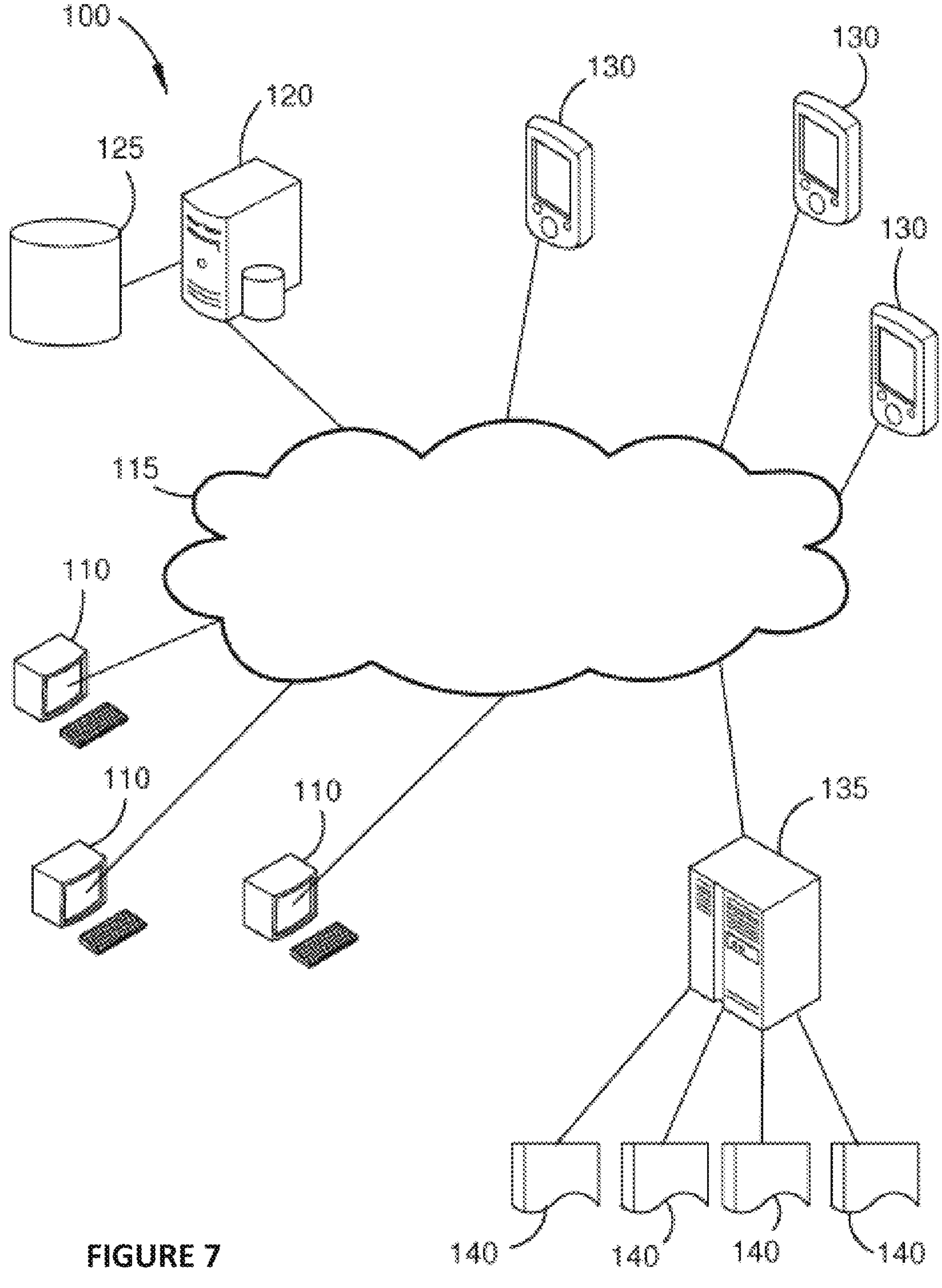
FIG. 7 is a schematic diagram showing a system for providing a car wash and/or related car cleaning service.
Figure 8:
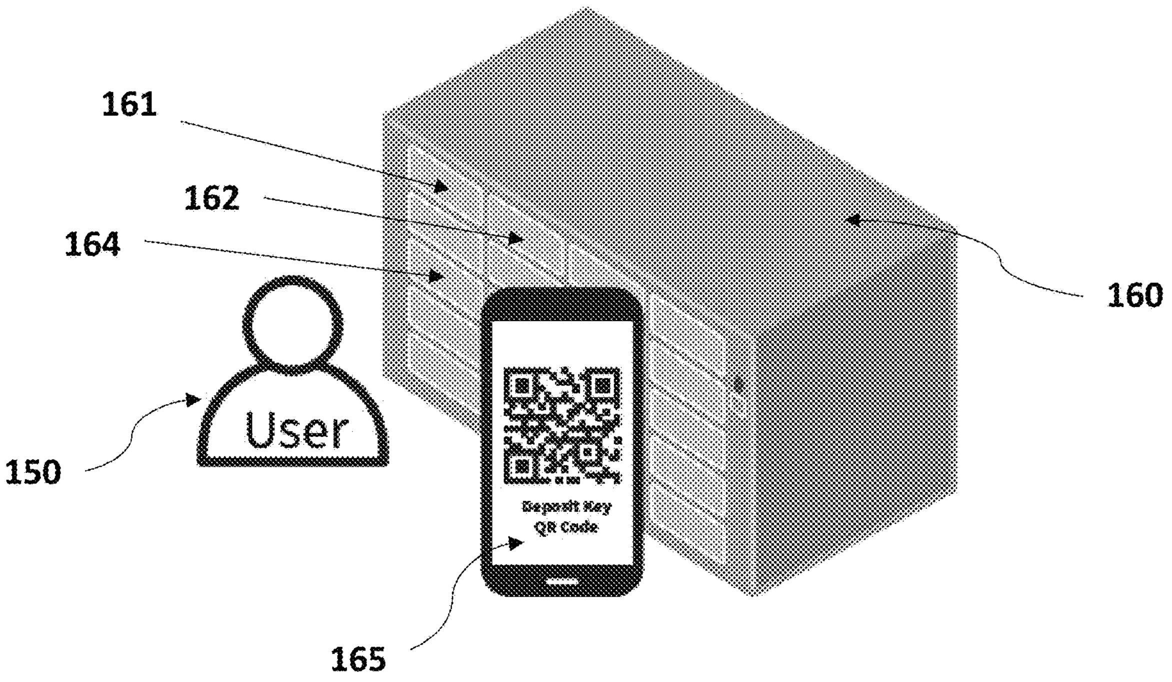
FIGS. 8 and 9 are diagrammatic views of a set of multiple compartments in accordance with an aspect of the invention.
Figure 9:
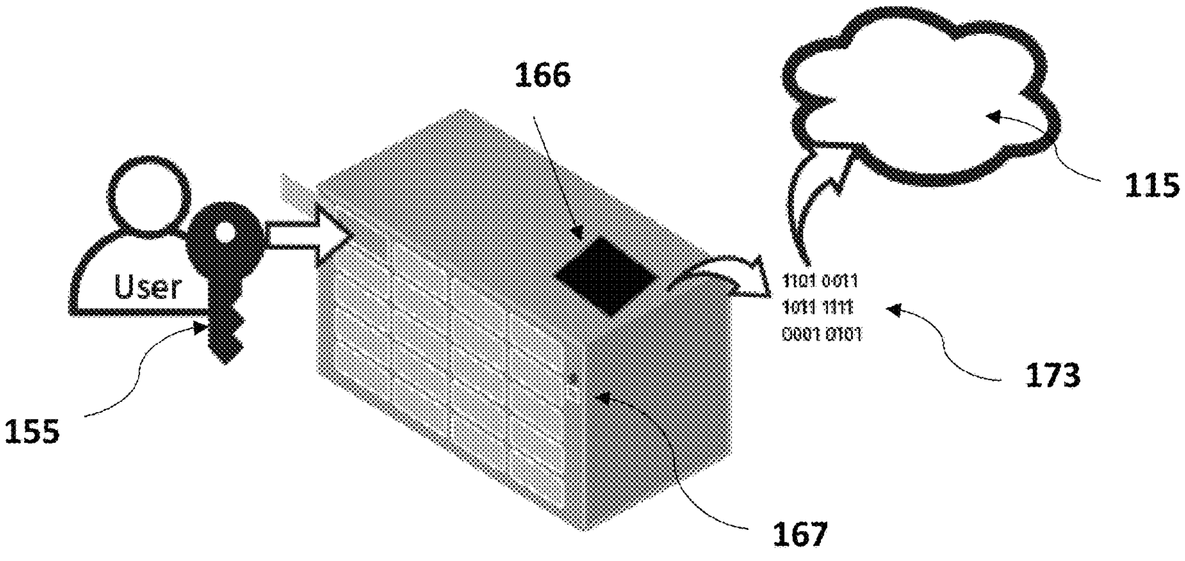
Figure 10:
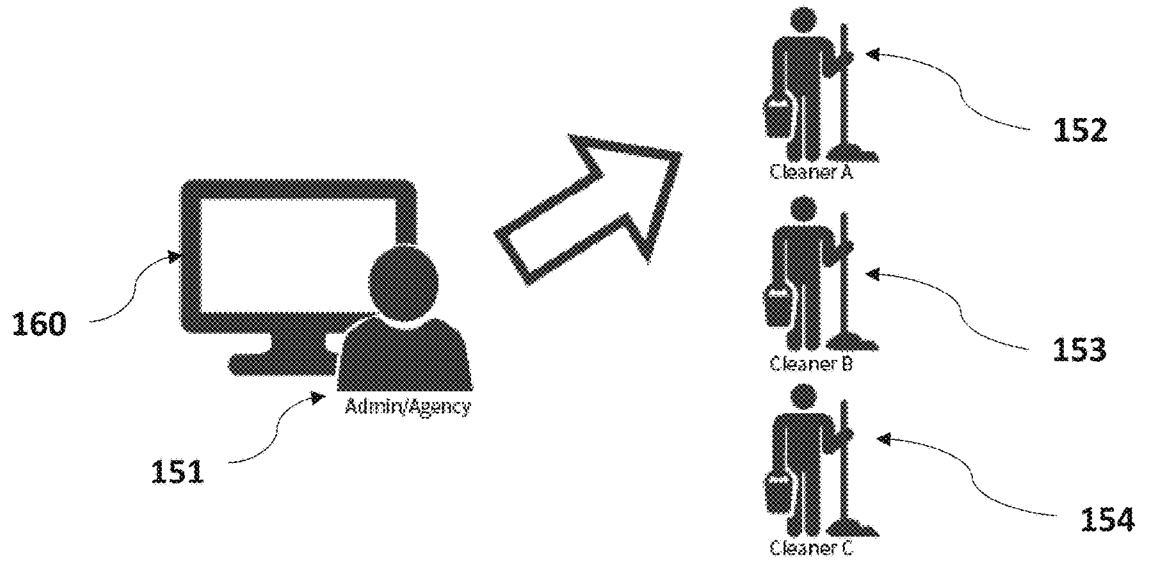
FIGS. 10 and 11 are diagrammatic views of operation of a use of the system in accordance with an aspect of the invention.
Figure 11:
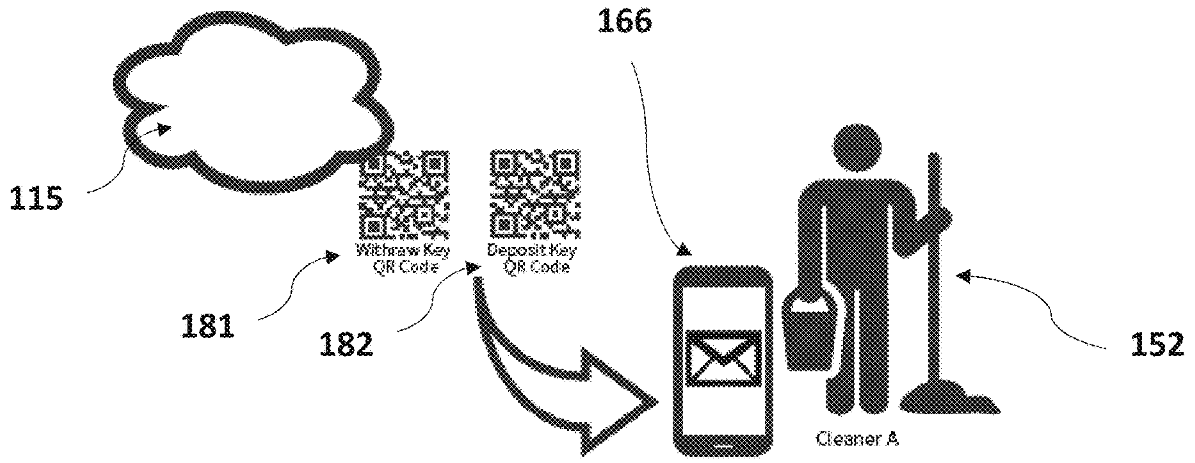
Figure 12:
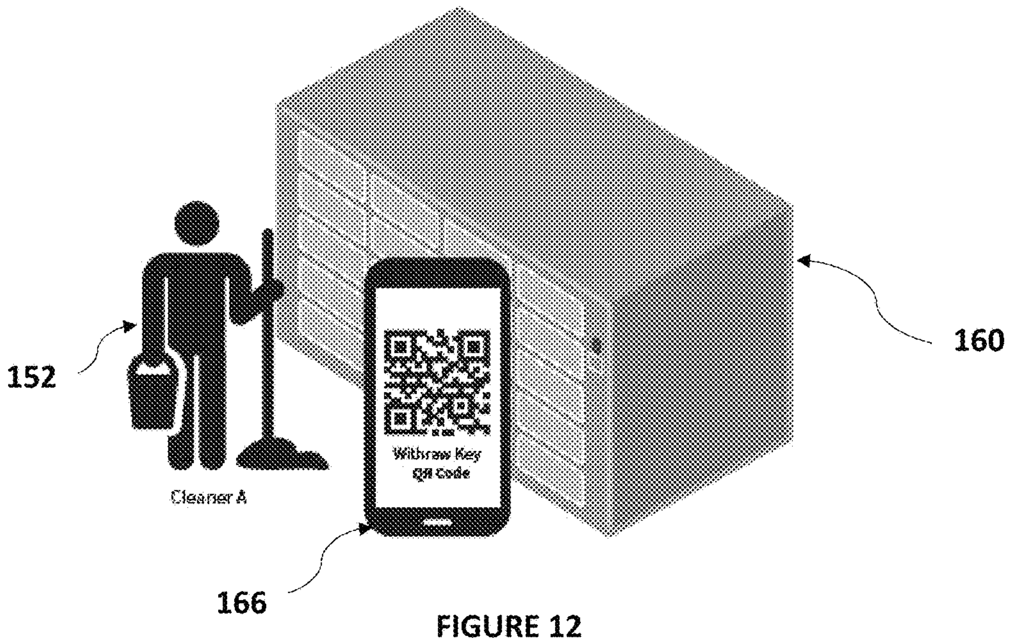
FIGS. 12 and 13 are diagrammatic views of the set of multiple compartments of FIGS. 8 and 9 in use in accordance with an aspect of the invention of FIGS. 10 and 11.
Figure 13:
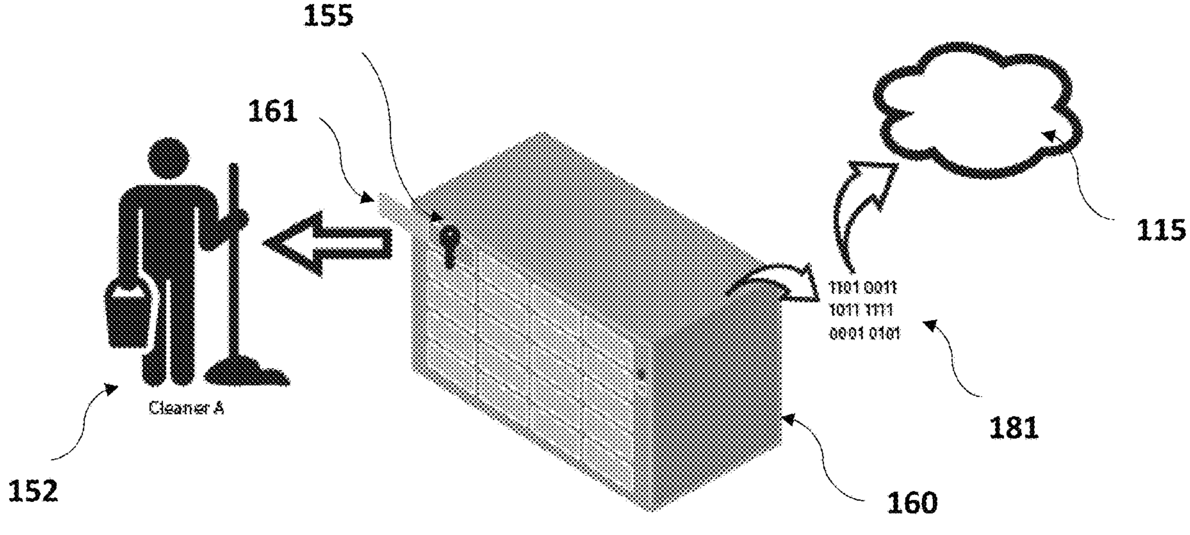
Figure 17:
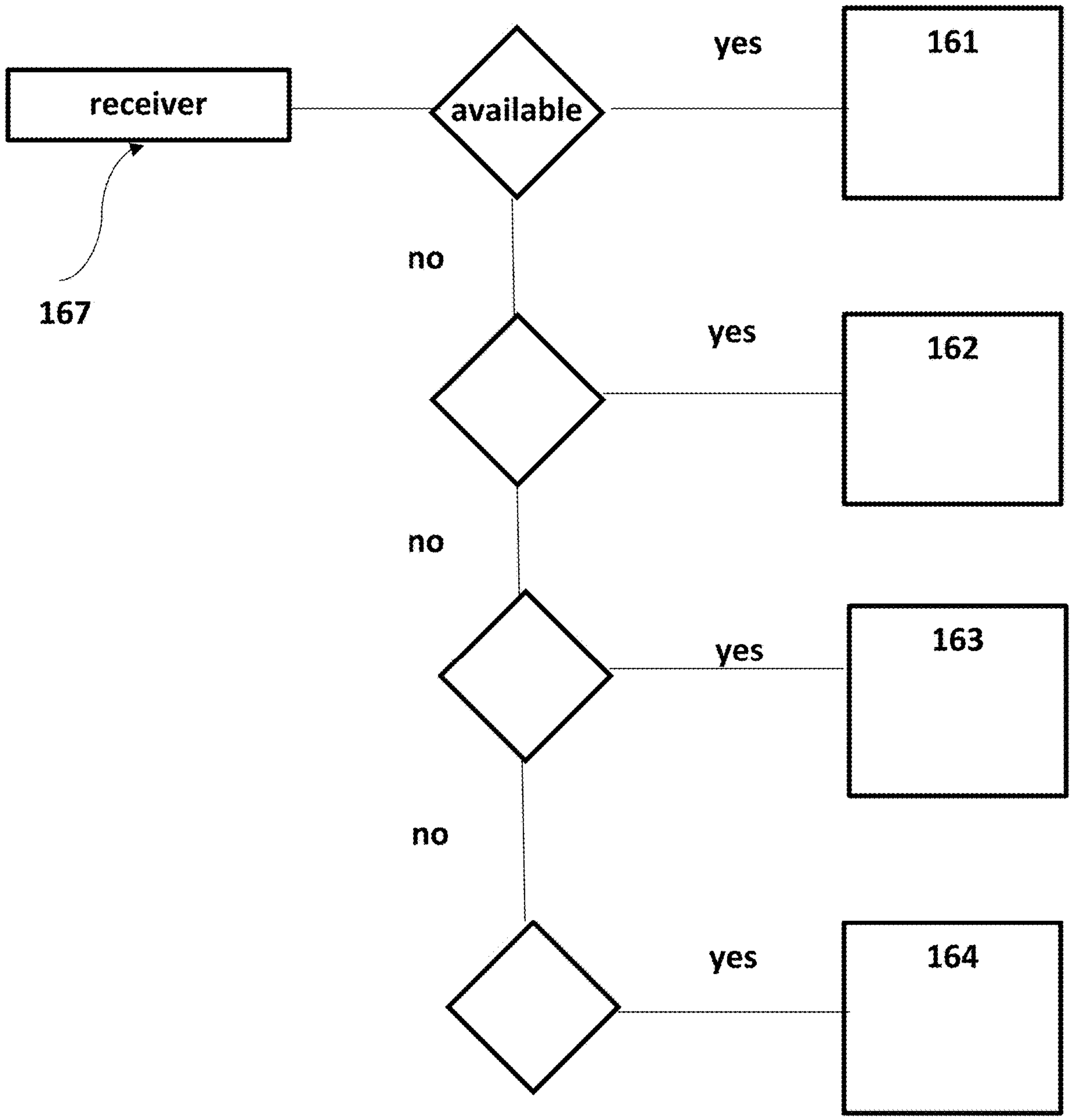
FIG. 17 is a diagrammatic view of an operational control of the application of the digital lock to a selected one or next one of the multiple compartments of FIGS. 8 and 9.

Referring to FIG. 17 there is shown the mechanism for controlling the opening of the compartments 161, 162, 163 without being limited to a predefined use or user. Therefore initially the receiver 167 on the compartments 160 receives a QR code for requesting a compartment such as initially by the user 150 creating the deposit key QR code and the identity tag 173. After receiving the code, the control system 166 of the compartments interrogates the first compartment 161 and determined if it is available or has already been allocated and is locked awaiting the keycode and timecode to operate. If available then being the first in line it will open and can be set up for receiving the physical key 155 or other element and appropriate identity tag 173 formed and transmitted as wirelessly 181 by control 166 through digital transmission 115 such as the system of FIG. 7.

If the compartment 161 is already taken and therefore the interrogation results in a NO if it is not available, the system moves on linearly to the next compartment 162 and onwards until a compartment is located.

A major improvement of this lineal system is that compartment 161 and 163 could be in use but compartment 162 was in use but is now available. Therefore, the system is able to maximise its use with restricted numbers of compartments by linearly progressing through and reusing compartment 162 rather than merely checking the last number used and moving to the next number. Further an advantage of security applies as it is not possible to predict the next compartment and therefore the physical person will not be able to know which compartment will be used by which users.

Figure 18:
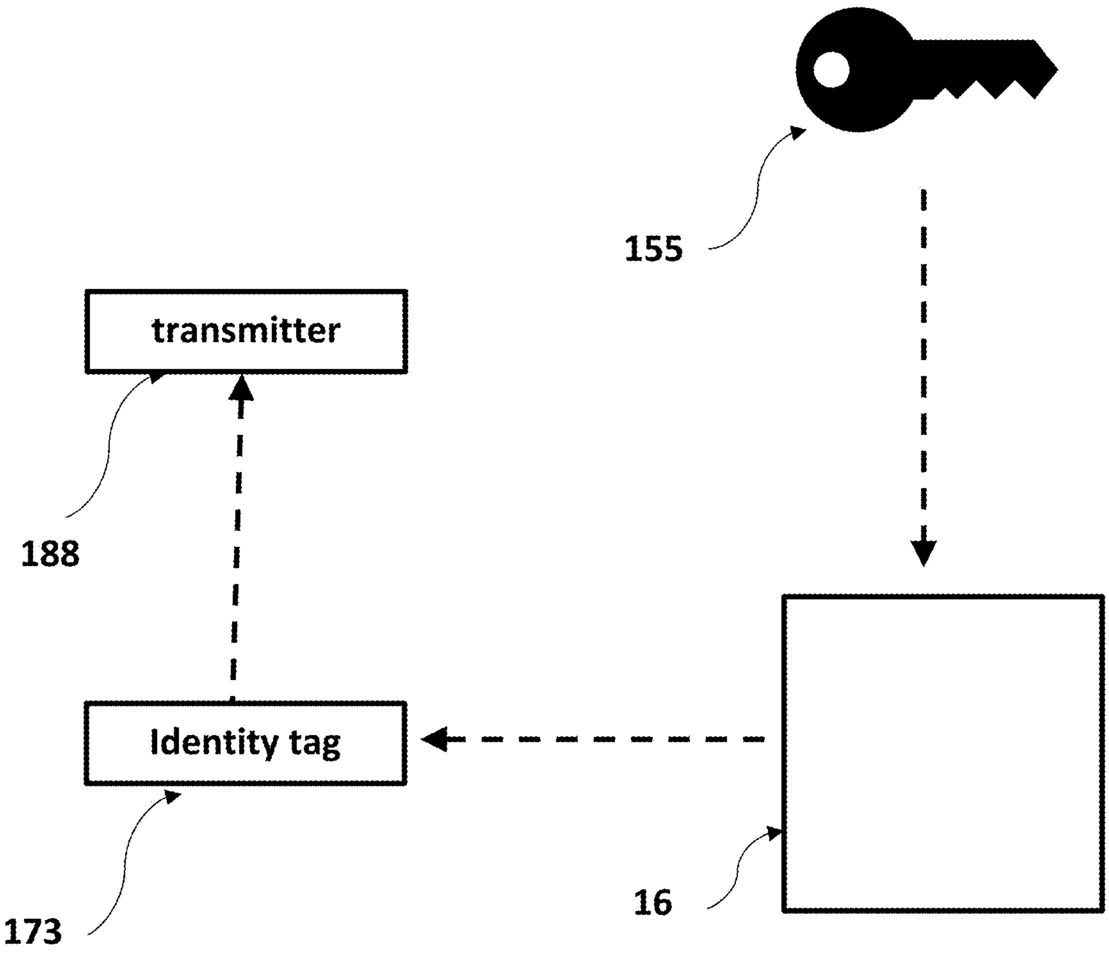
FIG. 18 is a diagrammatic view of an operational control of the digital lock comprising timecode and keycode for use on the multiple compartments of FIGS. 8 and 9.

In FIG. 18 there is shown that the user is able to provide a physical key 155 into the designated compartment 164 and an identity tag 173 created and sent digitally to be on-sent by transmitter 188. Therefore the physical lock is controlled by a digital lock system and creates a digitally transmittable control system that coordinates with a physical system to provide a synergistic and adaptable system.

Figure 19:
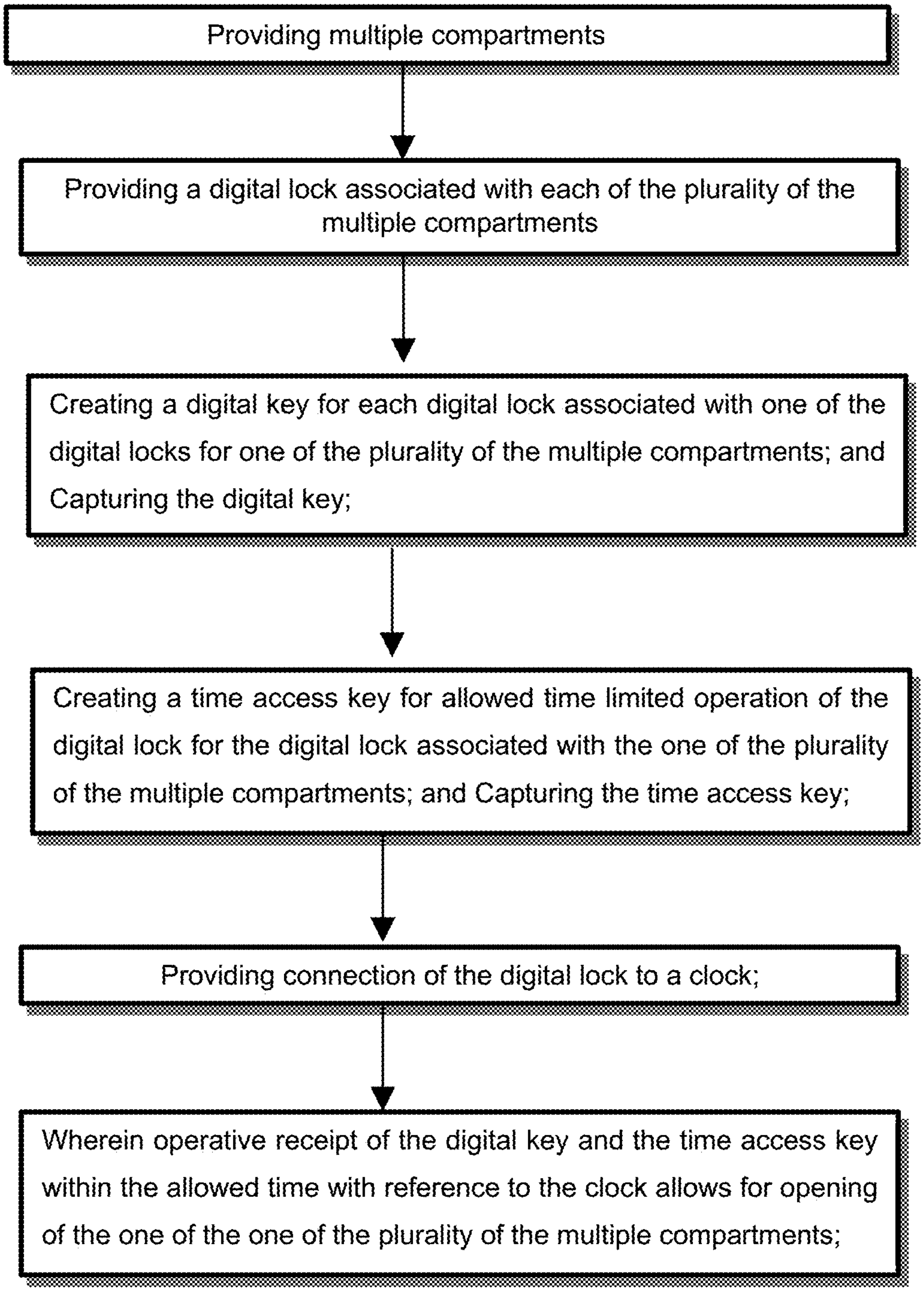
FIG. 19 is a diagrammatic block diagram of a method of controlling access to compartments in accordance with an embodiment of the invention.

Referring to FIG. 19 there is shown a method of controlling access to compartments. This includes a plurality of steps.

Initially there is provided a set of multiple compartments 160 which include individual compartments 161, 162, 163 . . . . Each compartment is provided with a digital lock 190 whether individually or controlled individually from a control 166 associated with the plurality of the multiple compartments 160.

In operation there is created a digital key 171 for each digital lock 190 associated with one of the digital locks for one of the plurality of the multiple compartments 161, 162, 163, and capturing the digital key;

In order to restrict access in a time sense there is created a time access key for allowed time limited operation of the digital lock for the digital lock associated with the one of the plurality of the multiple compartments and capturing of the time access key.

The system must have the keylocks for the compartments to have connection of the digital lock to a clock.

Thereby when there is operative receipt of the digital key and the time access key within the allowed time with reference to the clock allows for opening of the one of the one of the plurality of the multiple compartments.

Figure 20:
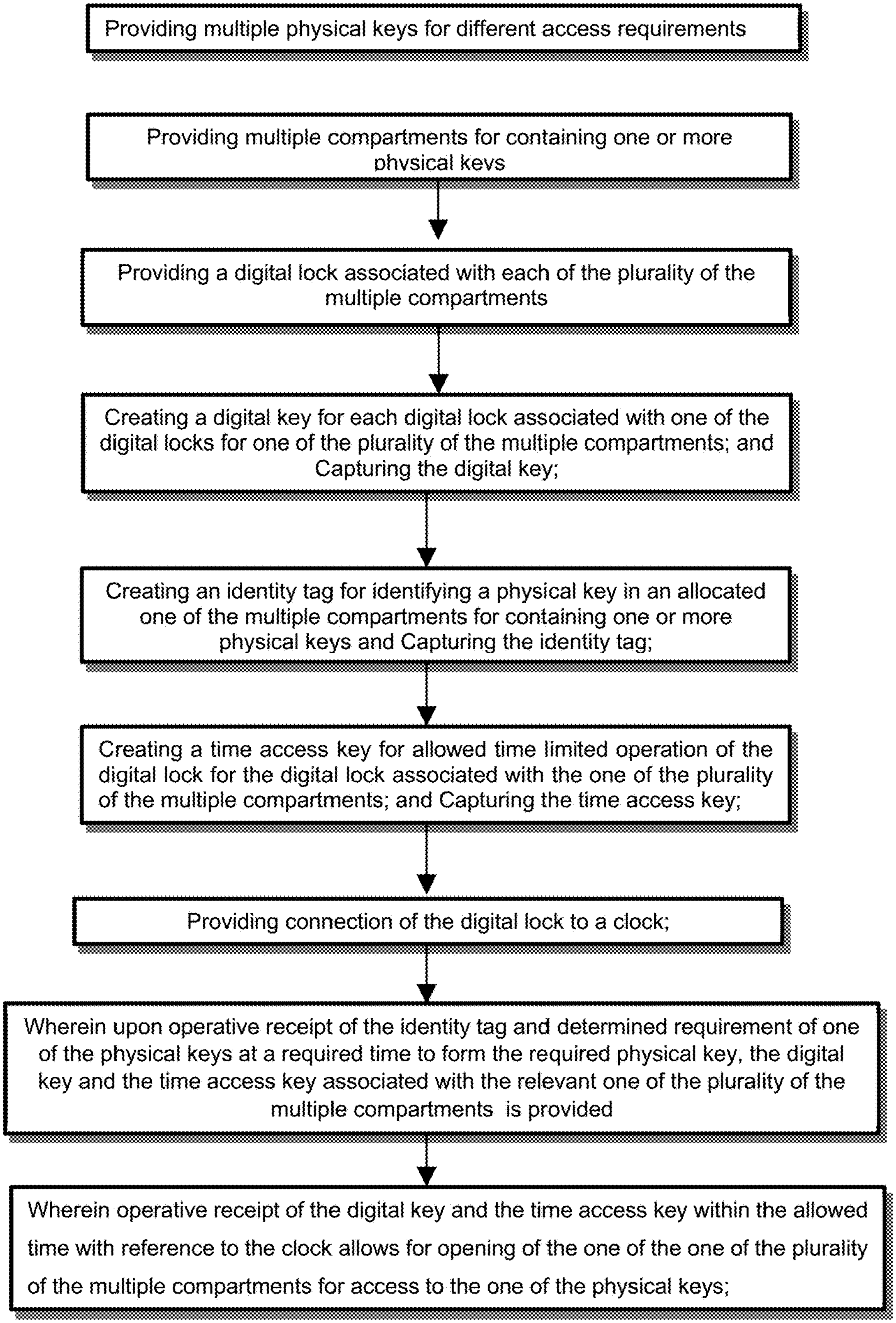
FIG. 20 is a diagrammatic block diagram of a method of controlling access to keys in accordance with an embodiment of the invention.

Referring to FIG. 20 there is provided a method of controlling access to physical keys using the system. This includes the steps of the physical system of providing multiple physical keys for different access requirements, providing multiple compartments for containing one or more physical keys and providing a digital lock on each of the plurality of the multiple compartments.

There are the steps of creating a digital key for each digital lock associated with one of the digital locks for one of the plurality of the multiple compartments and capturing the digital key;

Further there needs to be the steps of creating an identity tag for identifying a physical key in an allocated one of the multiple compartments for containing one or more physical keys and capturing the identity tag.

Still further there needs to be the creating of a time access key for allowed time limited operation of the digital lock for the digital lock associated with the one of the plurality of the multiple compartments and capturing the time access key.

However it is necessary that there is a connection of the digital lock to a clock so that the operative receipt of the identity tag and determined requirement of one of the physical keys at a required time to form the required physical key, the digital key and the time access key associated with the relevant one of the plurality of the multiple compartments is provided.

The operative receipt of the digital key and the time access key within the allowed time with reference to the clock allows for opening of the one of the one of the plurality of the multiple compartments for access to the one of the physical keys.

Figure 21:
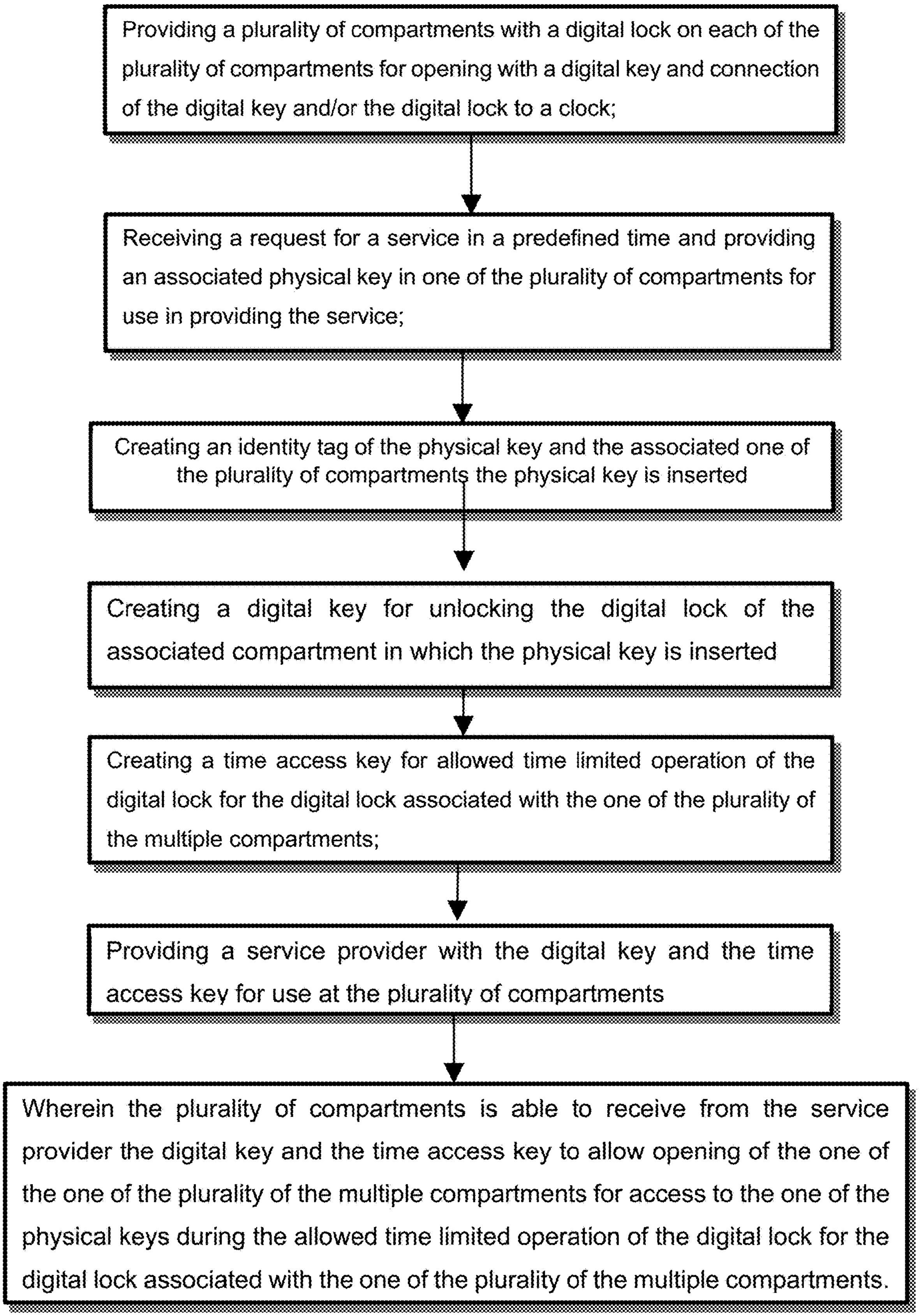
FIG. 21 is a diagrammatic block diagram of a method of providing services requiring access in accordance with an embodiment of the invention.

Referring to FIG. 21 there is shown a method of providing services requiring access. To undertake these services a service provider such as a cleaner 152 needs a key 155 for access to an apartment, vehicle or other lockable asset. To enable the cleaner to have access and remotely control that access while still allowing the same key to be used by another service provider at another time there is provided a time-controlled access.

This is achieved with the step of providing a plurality of compartments with a digital lock on each of the plurality of compartments for opening with a digital key and connection of the digital key and/or the digital lock to a clock.

A request for a service in a predefined time is received and provided with an associated physical key in one of the plurality of compartments for use in providing the service.

An identity tag is created of the physical key and the associated one of the plurality of compartments the physical key is inserted. In this way the contents and location and use of the physical key is defined and transmittable in a digital manner.

A digital key is created for unlocking the digital lock of the associated compartment in which the physical key is inserted. In this way the compartment is able to be defined at the time of use and an appropriate digital lock created so that it can be transmitted digitally.

A time access key is created for defining a timecode of allowed time limited operation of the digital lock for the digital lock associated with the one of the plurality of the multiple compartments. In this way a compartment is not forever in use and reliant on physical control but provides security to user so that the physical key is only accessible in a defined period and its return is identified and controlled. Therefore not only is the start of the access defined but the end of the access is confirmed.

Providing a service provider with the digital key and the time access key for use at the plurality of compartments Wherein the plurality of compartments is able to receive from the service provider the digital key and the time access key to allow opening of the one of the one of the plurality of the multiple compartments for access to the one of the physical keys during the allowed time limited operation of the digital lock for the digital lock associated with the one of the plurality of the multiple compartments.

Variations

It can be seen that the system of the invention is variable in its configuration and how access can be coordinated at the control of the individual patron. However multiple patrons can use the same hardware and be able to work parallel or to be intertwined in operation.

However also when there is a need for sequential access such as a painter first and later the plumber or furniture delivery there is capability of control with only a single set of access keys but with controlled access from the key safe and first and second departments in the key safe.

Capabilities

It can be seen that the key access system of the invention provides a multitude of capabilities that were not previously available including:

a) Security;
b) Timing control of access;
c) multiple users able to use system without multiple safes;
d) multiple users able to use system for single apartment without multiple keys;

e) scheduling by controlling primary access and secondary access;

f) indicating which key and which access department; and g) on-rolling scheduling Due to the request clock register and the starting access clock register and the allowed timing of the request clock register from the starting access clock register there is a controllable time access for a provider.

Due to the key safe having a primary lock on the key safe door there is rejection of normal access by anyone except authorised users. Due to the secondary access by at least first and second key compartments for containing the first and second keys or sets of keys, there is controlled access to individual users wherein each of said at least first and second key compartments includes a lockable compartment closure for selectively providing access to the compartment.

Example 3

The following description outlines an example of the system and method for use in providing a car wash or related car cleaning service to individuals which are residents of an entity such as a building complex which is controlled by a body corporate or similar.

In particular the method is in relation to an apartment building has a secure repository for the deposit of car keys, to enable individuals who have made bookings to leave car keys for access to their car, and wherein the service personnel, and not said individuals, have a means to access the secure repository to retrieve deposited car keys to enable cars in the apartment building to be moved to a service area by the service personnel.

The booking made by the individual includes information related to when the service is required to be provided.

The system for providing a service to one or more individuals associated with an entity, the system including: one or more terminals for receiving service booking and payment information from a user;

a service database for receiving service booking and payment information; one or more service terminals for receiving service booking information from the server such that the service can be completed and a confirmation to be sent back to the server and to the individual concerning completion of the service.

The server is arranged to periodically calculate a payment, over a predetermined time period, to be paid to the entity based on one or more predetermined criteria and transmitting the payment to the entity.

The system and the method utilise a number of user terminals connected to a network (which may be a LAN, WAN or the Internet) which all operate via a website, and one or more service personnel terminals. The system can be configured to operate on a 3G or similar mobile telephone network.

The system 100 includes a number of individual users which correspond to owners of cars who live within one or more apartments or buildings in which the service is provided. The building is therefore associated with an entity which may be a body corporate for example. The system shown includes one or more concierge terminals 110. The users may interact with the system 100 directly or the users may interact with the system indirectly via one or more concierge terminals 110.

In this case, the user individual being the tenant or owner of a particular apartment within the building would make a request for a car wash service through the concierge 110. If there is no concierge, or the concierge is not available, the individual can make a request themselves through the network. This can be accessing a web site from an individual's computer device. The network 115, such as the Internet, may be accessible via a terminal such as a PC Laptop or the like, or a mobile communication device. Also connected to the network 115 is a booking and payment service 120 which includes a database 125 for storing information received from user individuals. The information stored may include personal data information and other particulars. It can also include booking data information for services that have been performed and for services that are to be performed.

A number of car wash terminals 130, being terminals of personnel that will provide the service, have access into the network 115 to obtain information about future bookings and to provide information when a service has been performed. Each terminal 130 may include one or more of a mobile telephone, a computer terminal, a laptop or a portable digital assistant or the like. The database 125 is connected with the booking and payment servicer 120 and is configured to store information received from the car wash terminals 130 concerning the service performed, such as when the service has been completed.

The booking and payment server 120 is also connecting to a banking server 135 which may be associated with a banking institution for transferring payment funds as will be described hereinafter. Connected to the banking server 135 are one or more accounts 140 which correspond to bank accounts associated with the entities such as the owner's corporation, body corporate, and also individual's accounts.

Figure 22:
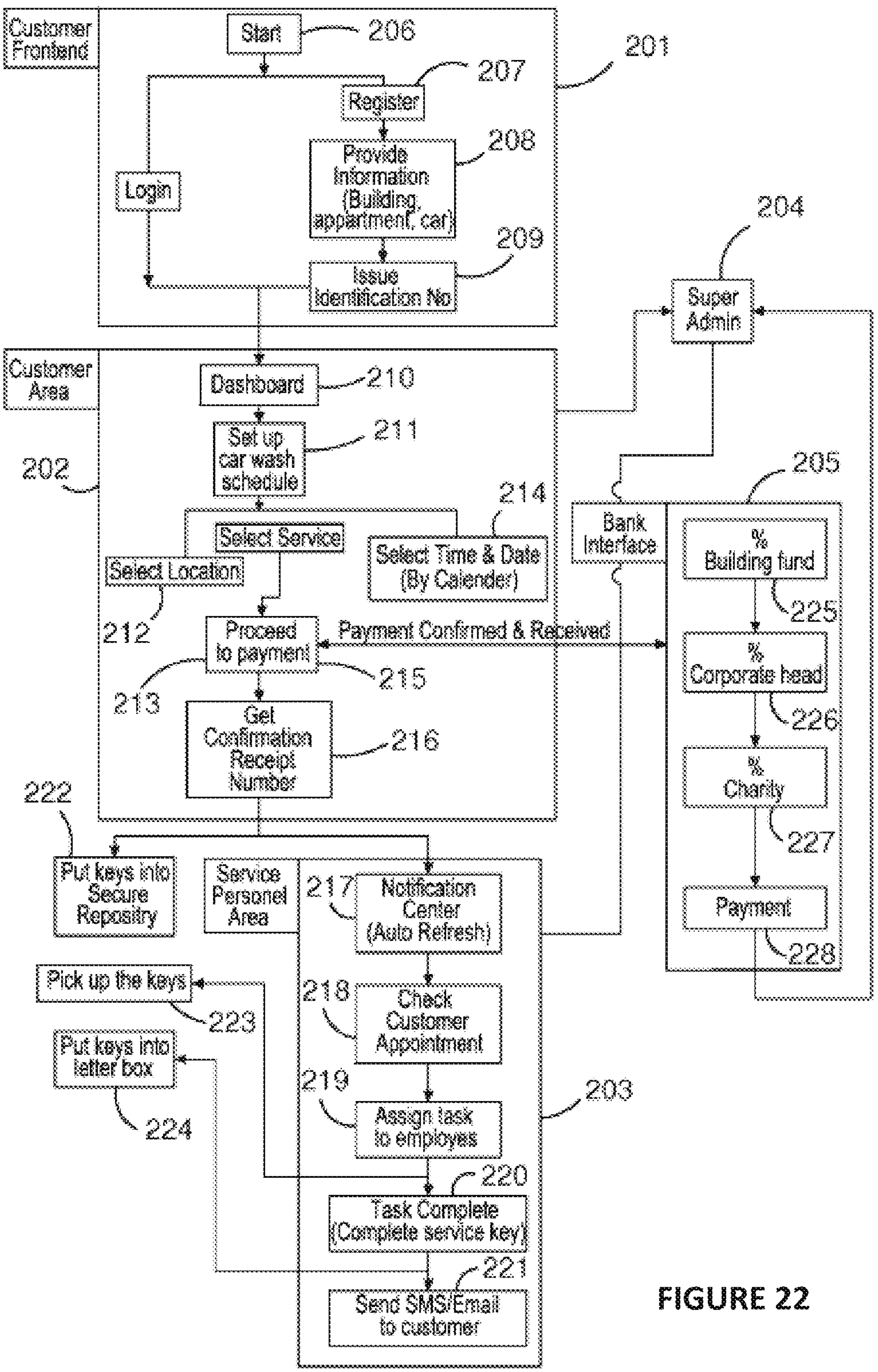
FIG. 22 is a functional flow diagram showing process steps in an example of the system in accordance with the invention such as shown in FIG. 7.

FIG. 22 shows a basic functional flow diagram of process steps in the system. The system has a customer front end block 201, a customer area block 202, a server personnel area block 203, and an administration area block 204, and a banking interface block 205. A customer of the system being an individual will access a booking process by a user or a concierge 1 accessing the system via a telephone, mobile communication device, computer terminal or the like. Alternatively, the individual may have a card which can be swiped which contains all the information to identify the individual. The card may be a loyalty card which provides discounts based on one or more conditions.

Accordingly, when a user individual accesses the customer front end 201, the process is commenced at step 206. The individual, if registered in the system, then logs in and proceeds to the customer area 202.

Alternatively, if the individual is not a registered user then the user is diverted to a registration process which comprises a register activation section 207 where data concerning the individual is entered at step 208. When the registration has been completed, an individual is issued with an identification number at step 209. The processes in the customer front end 201 may include other detailed steps in order to check validity of the individual, lost passwords and the like. These check features have not been shown as they are considered standard processes for online databases and would be regarded as common knowledge in their own right.

Once the individual has completed processing through the customer front end 201, they are transferred to a customer area 202 and presented with a dashboard 210. The individual then proceeds to step 211 to set up a car wash schedule. The car wash schedule step 211 requires identifying the vehicle location at step 212, the type of service required at step 213, and the time and date of service at step 214.

Once the initial setup at steps 211, 212, 213 and 214 have completed, then the individual is taken to a payment step 215. Here, there is a bank interface 205 where there can be debiting of the individual's bank account credit card, or similar. The detail of the debiting processes have not been shown as these are considered to be known in the banking arts. The banking interface 205 has other process steps that will be referred to in due course.

Once the payment has been transacted, then the banking interface provides a confirmation to the administration area 204 in the database 125. When the individual has completed the car wash schedule through steps 211, 212, 213 and 214 data is sent to the administration area 204 so that when the payment is approved by the banking interface 205 there can be matching of a payment for the booking made.

Once the payment has been made, the system proceeds to step 216 where the user is provided with a receipt number for the booking. The system then passes data to the service personnel area 203. Thus, when service personnel login to the system there will be a display of individual's bookings at step 217. The service personnel can then check for customer/individual appointments at step 218 and the actual service can then be assigned to the service personnel employees at step 219.

Once the service task is completed then the service personnel enter completion at step 220 and a message is then dispatched to the individual at step 221 confirming that the service has been completed. At the completion step 220, an indication may be dispatched to the administration area 204 so that completion of the service is recorded in the database 125.

Returning now to process steps within the customer area 202, it should be noted that when the customer/individual is provided with a confirmation receipt number at step 216, they are requested to place their car keys in a secure repository at step 222. This repository may be at a concierge desk or at an area designated for the services to be performed such as in a garage area of the building complex. Typically, the secure repository may comprise a locked box with a hole through which keys can be dropped.

Other forms of security repositories may be provided if desired and the locked box is just one example. The service personnel have access to the secure repository such as by using a key of being identified by the concierge in order to retrieve the relevant keys. When the individual registers in the system and provided with an identification number at step 209, the individual may be issued with a key ring and tag with that identification number imprinted therein.

The individual may use that key ring for their car keys so that when the car keys are dropped in the secure repository, the service personnel can determine which car keys are matched to which car. In that way, the service personnel can identify particular keys from a large number of such keys that may be in the secure repository. The identification number may also be used by individuals as a login user name or password so their personal details can be extracted from the database 125.

When the service personnel have collected the keys at step 223, they can locate the car and drive it to the designated area where the booked service is to be performed. When the service has been completed the service personnel can then return the car to its original location and then return the keys to the letter box of the individual in the apartment complex. In that way, the individual can retrieve their keys from a further secure repository (their letterbox) dedicated for their use only. This is identified at step 224 where the service personnel deposit the keys into the letter box of the individual. In the bank interface block 205 there are a number of possible process steps. The ones shown are given as an example, and any one or more of those shown may be used and, in addition, others may be substituted.

When a payment is to be made, the banking interface block 205 will attribute a portion of the fee to be charged to, for example, a building fund 225 and or a percentage to a corporate head or body corporate 226 and/or to a charity fund. In addition, a component of the fee for the service may include a component to cover costs associated with rental of the necessary service area in the apartment block required to perform the services.

It may also include components to cover the cost of consumables such as water, car polish and garbage disposal. Accordingly, process steps for this nature may be incorporated within the banking interface block 205. The banking interface 205 also includes details of a system coordinators bank account so the system coordinator (the owner of the system and controlling the whole system) may receive payments. At step 228 the payment is transacted and confirmation provided into the administration area 204.

It should be appreciated that the attribution of a portion of the fee to the building fund or body corporate is a feature of one embodiment and not a feature of the broader invention per se.

Figure 23:
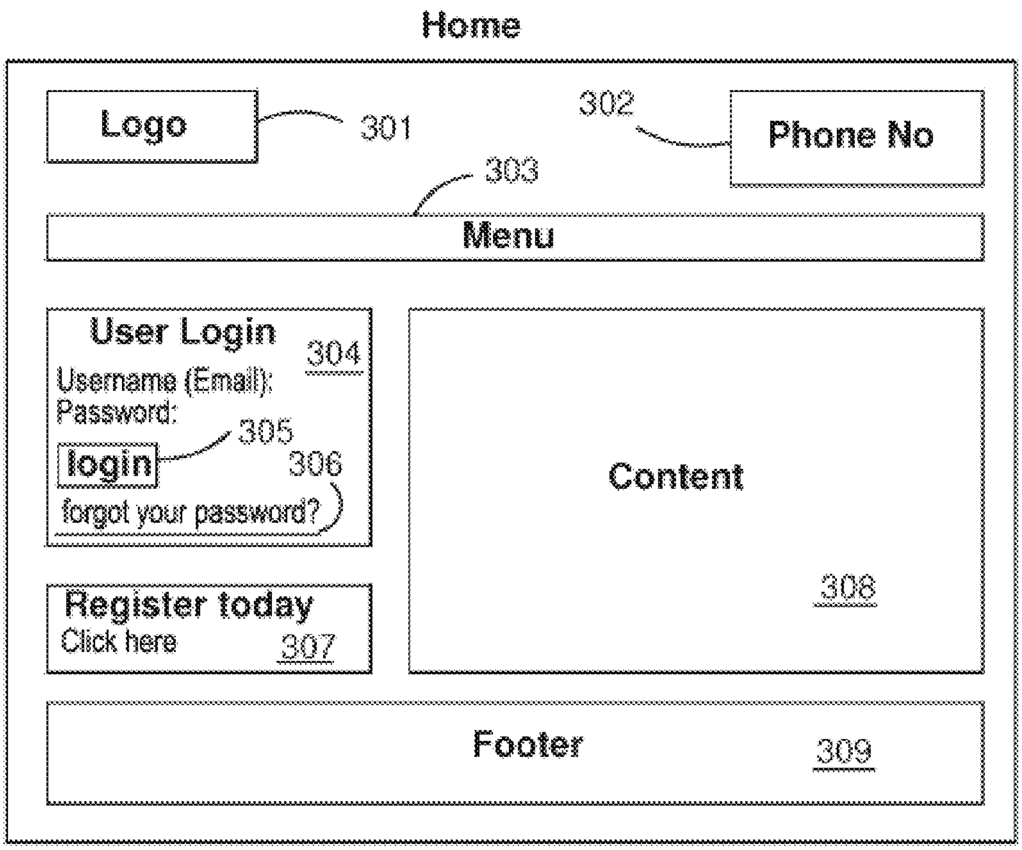
FIG. 23 shows an individual's user login screen.

FIG. 23 shows a page viewable to an individual when they log into the system at step 206. The screen display is essentially self-explanatory. There is a section 301 for the service organisation logo or trade mark. There is a further section 302 for the phone number of the service entity. A general Menu section 303 is also provided. A user login area 304 is also provided with a requirement for user name and password. The user name may comprise an email address or other data and may, in fact, include the customer individual identification number referred to in step 209 previously. A log in button 305 is provided as well as a forgotten password area 306. A registration button 307 is provided to permit an individual to register in the system. Areas 308 and 309 are provided for content that may require to be added by the system owner such as photographs, or marketing material.

Figure 24:
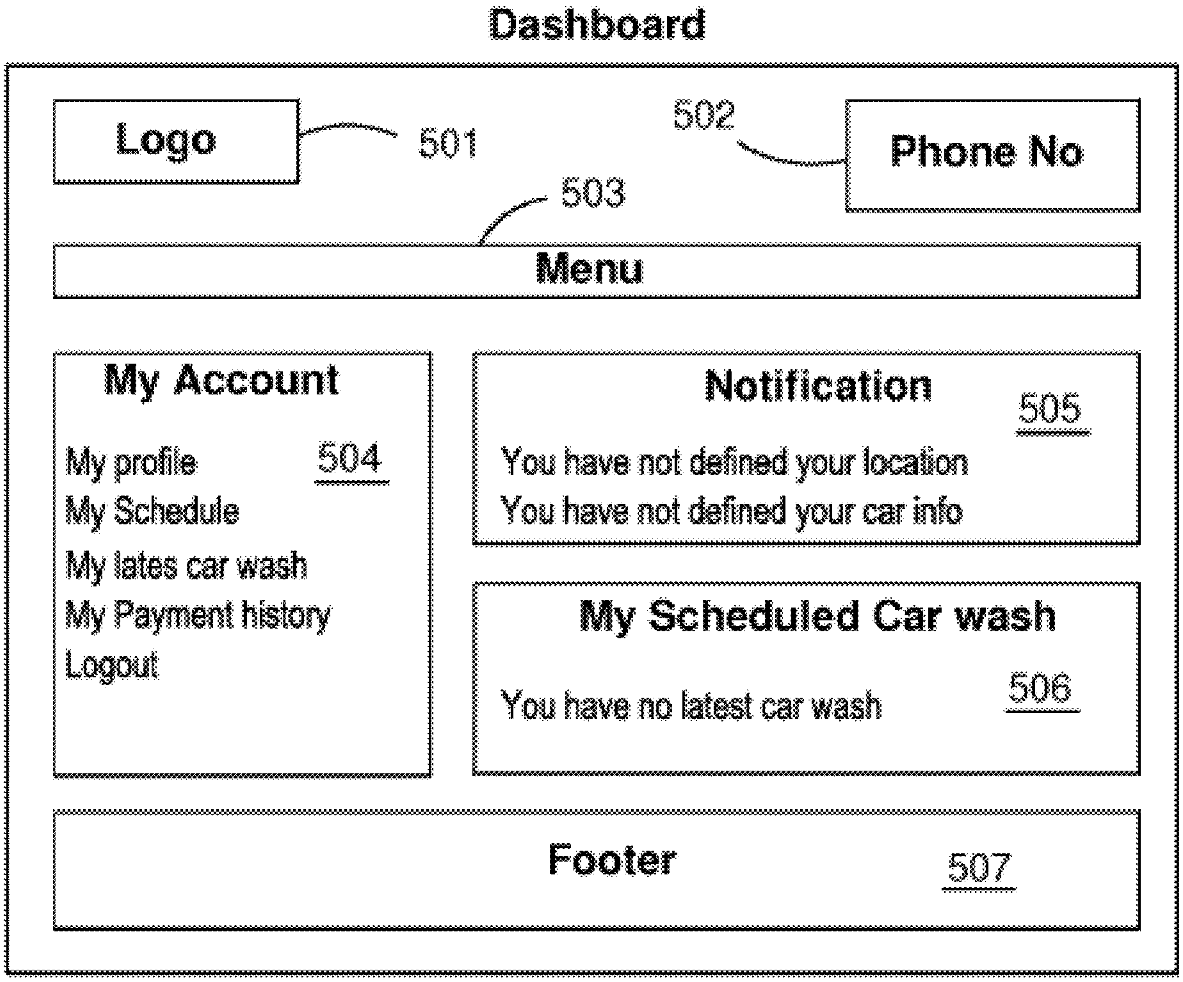
FIG. 24 shows a user's Register screen.

FIG. 24 shows a screen display when an individual requires to register in the system. Here the screen display is basically self-explanatory. There is a logo area 401 where the system owner's logo or trade mark can be provided. The system owner's phone number is shown in area 402. A general menu heading area is shown as 403.

A user's login area 404 is provided in case there is accidental invoking of the application for registration and a need to quickly return to the booking process. This obviates the need to return to the screen shown in FIG. 9. Area 405 is provided to allow the individual to insert data into the system.

The examples shown of the data are exemplary and not meant to be exhaustive. Part of the data includes billing accounts information where a system can take money for payments of the services provided. This information may be direct debit, credit card or other facility for payment. It may include account numbers and passwords, and in the case of credit cards the CCV number. A Register button 406 is provided to enable the data to be posted into the system database. A footer area 407 is provided to permit any required data such as advertising material to be displayed by the system owner.

Figure 25:
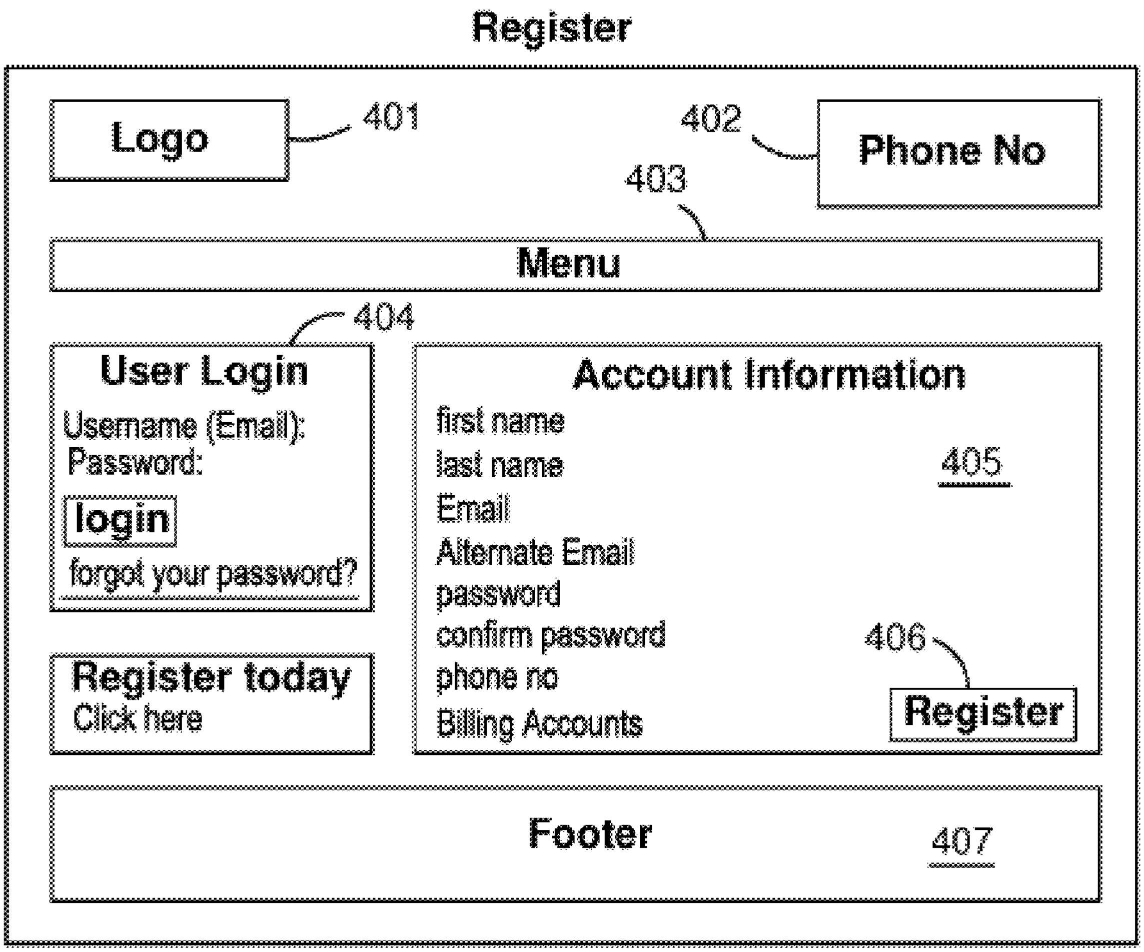
FIG. 25 shows a user's Dashboard screen.

FIG. 25 shows the Dashboard presented to the user individual to enable the individual to negotiate into customer area 202. Here, there is an area 501 to display the system owners logo or trade mark and an area 502 for the system owners phone number. There is a further area 503 for a menu heading as in the previous screen displays. An area 504 is provided for displaying the individual's account information. This contains clickable buttons for each of the identified items where clicking will provide information about each of the entries. A logout button is also included within area 504. A notification area 505 is provided so there can be information presented to the individual about their car location in the building and their car information i.e. car make and registration no. or other information. A further area 506 is provided showing any Scheduled car washing. A footer area 507 is also provided to allow the owner of the system to display desired content.

Figure 26:
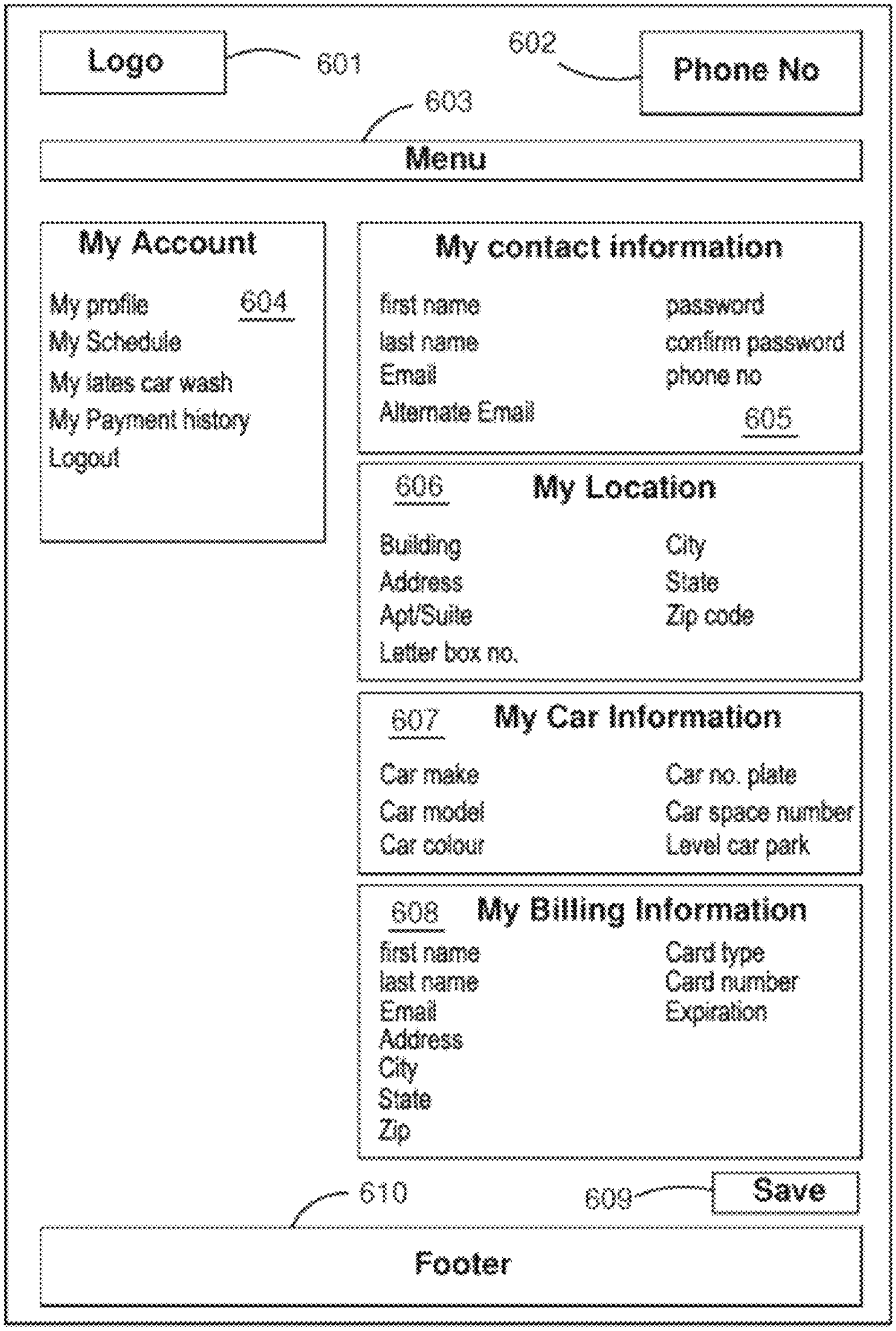
FIG. 26 shows a user's Profile screen.

FIG. 26 shows an individual's Profile information page where data can be entered. The screen display includes a logo trade mark area 601, the service owners phone number 602 and a menu area 603 as in the previous screen displays. It also includes an individual's account area 604 corresponding with the individual's account area 504 in the previous example. The screen display includes a My Contact Information area 605, a My Location area 606, a My Car Information area 607 and a My Billing Information 608. Each of these areas 605-608 have various fields for entry of individual data information. The examples shown are not exhaustive and not all are essential as in some embodiments there may be a change to these particular fields. A "save" button 609 is provided so that the entered data can be saved in the database 225. A footer area 610 is provided as in previous screen displays.

Figure 27:
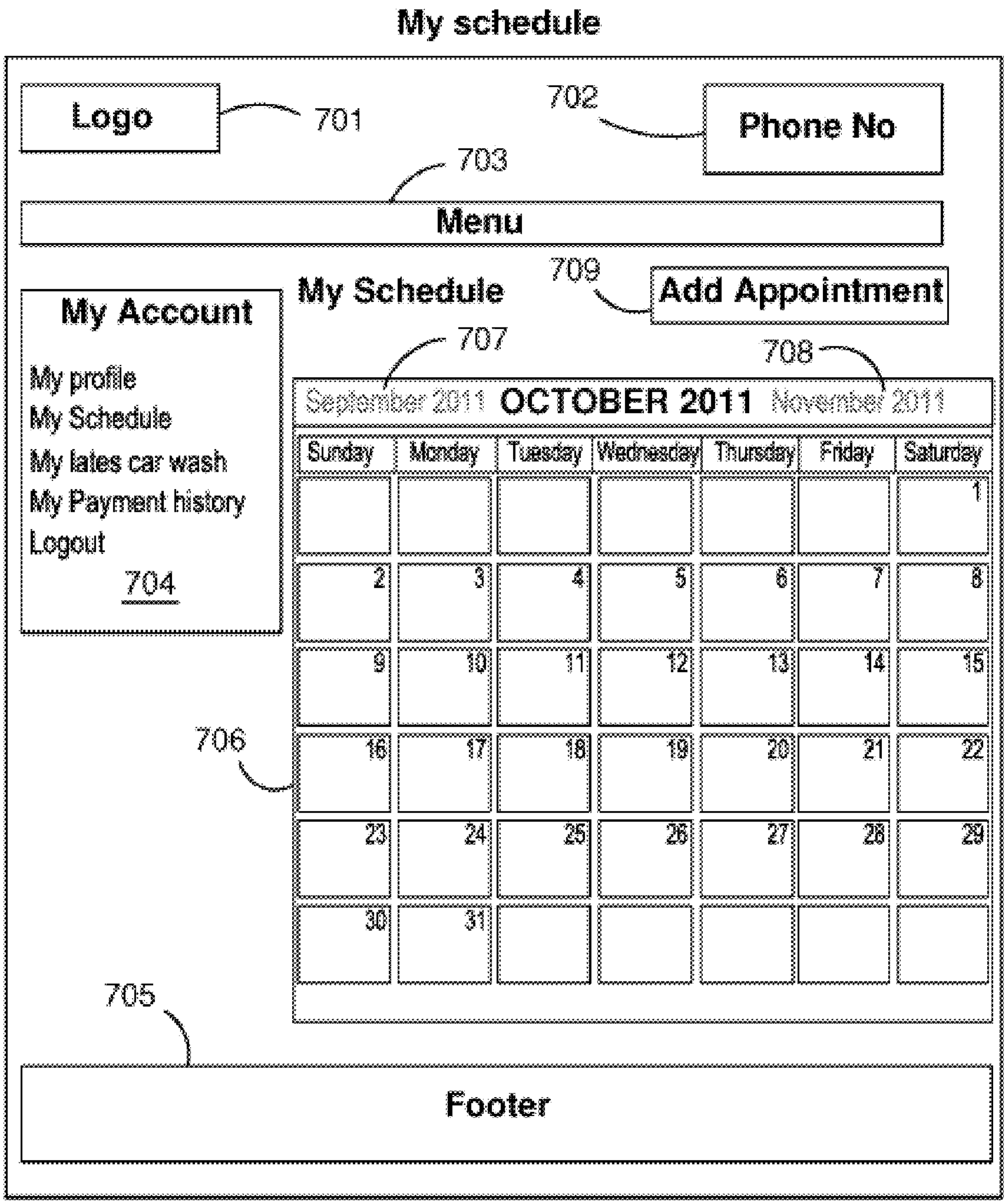
FIG. 27 shows a user's Schedule screen.

FIG. 27 shows a screen display for setting up a Schedule. There are screen areas 701, 702 and 703 corresponding to the same areas in the previous screen displays. A My Account area 704 is also provided as in previous screen displays, as well as a footer area 705 for the same purposes as in previous screen displays. An area 706 is provided showing a monthly calendar 706. A monthly calendar has been shown but this does not exclude providing a display for other periods such as daily, fortnightly, three monthly, six monthly and annually. The screen display shows an example for October 2011 but also shows clickable areas 707 and 708 to advance or retreat the period. An appointment button 709 is provided so that once a particular day is selected for the service the appointment will be posted into the database 225.

Figure 28:
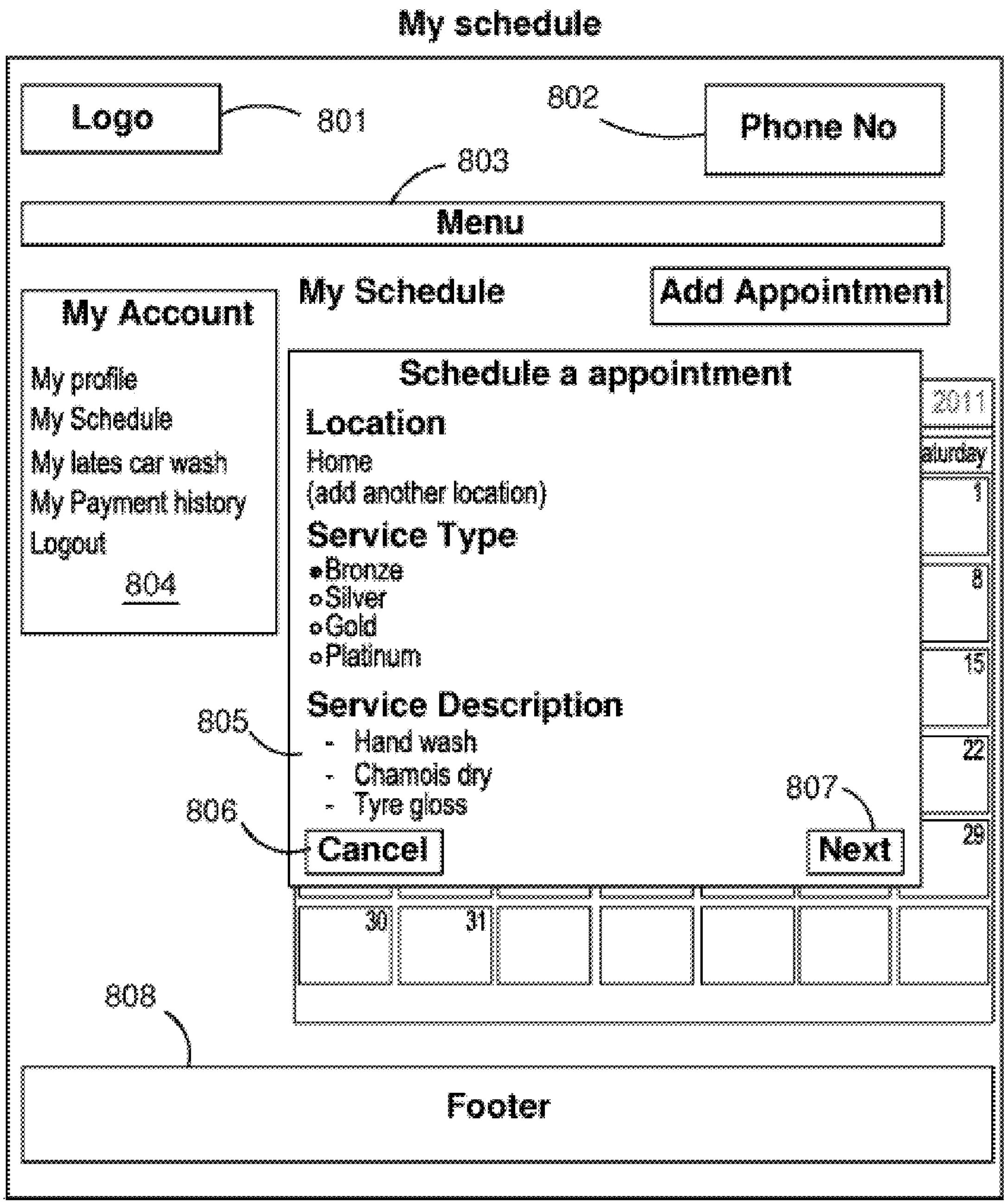
FIG. 28 shows a user's Schedule Service Type screen.

FIG. 28 shows the next screen display. Here, an area 805 is shown overlayed on the screen display shown in FIG. 27 however, this overlay arrangement may be dispensed with and instead the display shown in area 805 provided for the whole of the screen. Area 805 allows for the location of the service to be displayed or an alternative location such as at a place of employment of the individual. A Service Type is shown where service categories bronze, silver, gold and platinum have been shown. These are mere examples and other service types might be provided. Each of these types represents a different level of car wash service that is offered. A Service Description is also provided where a detailed listing of the services provided under each of the services selected under Service Type are shown.

The entries shown under the service description are exemplary only and are not exhaustive. The services may include for the Bronze service a hand wash, chamois dry, and tyre gloss. The Silver service can add extra services. The Gold service can add even further services. The Platinum service can add even further services. There may also be provision for extra services such as leather cleaning and conditioning, carpet steam cleaning, seat steam cleaning, paint protection, interior protection, cut and polish, interior steam cleaning. These are examples and are not exhaustive.

Figure 29:
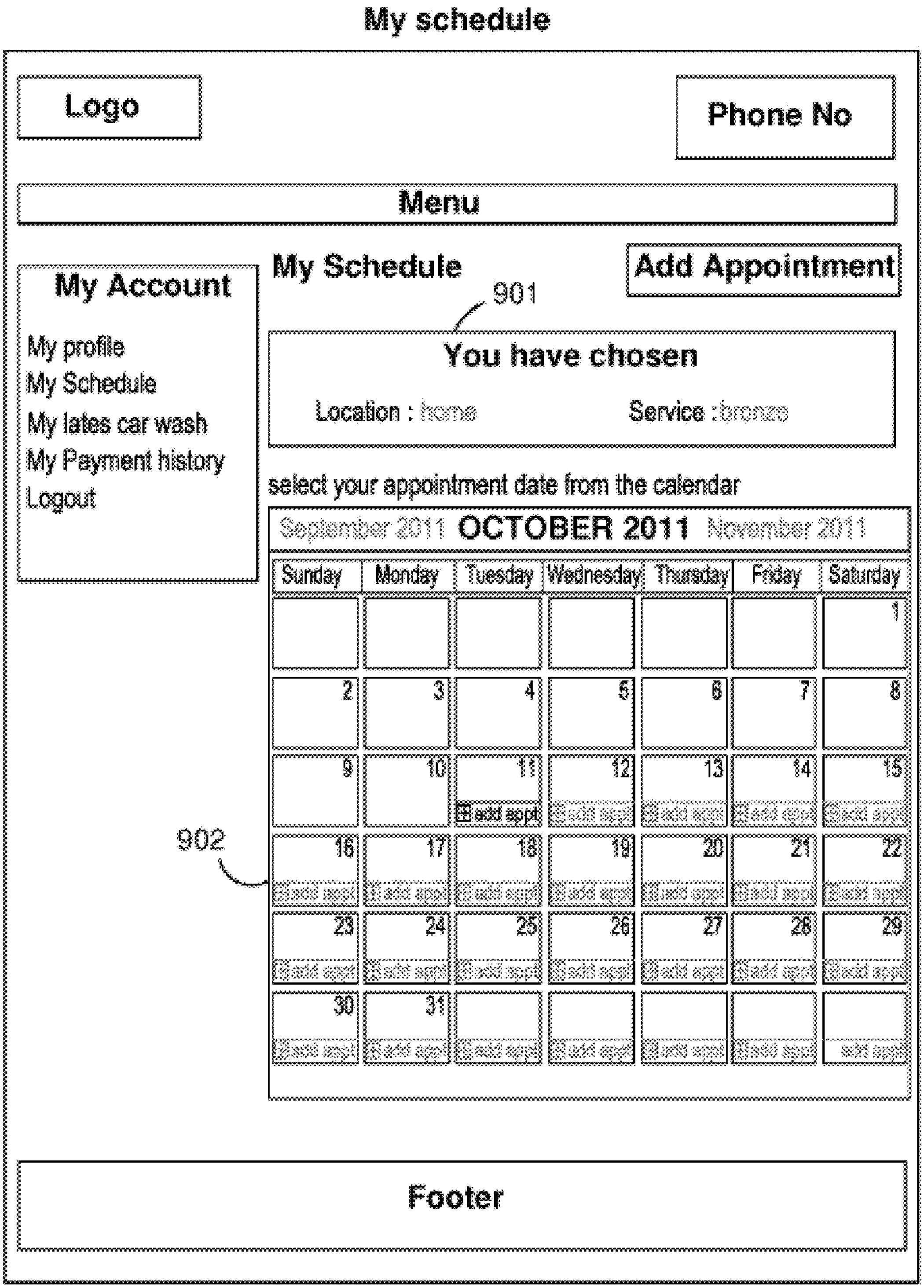
FIG. 29 shows a user's Booking Schedule screen.
Figure 30:
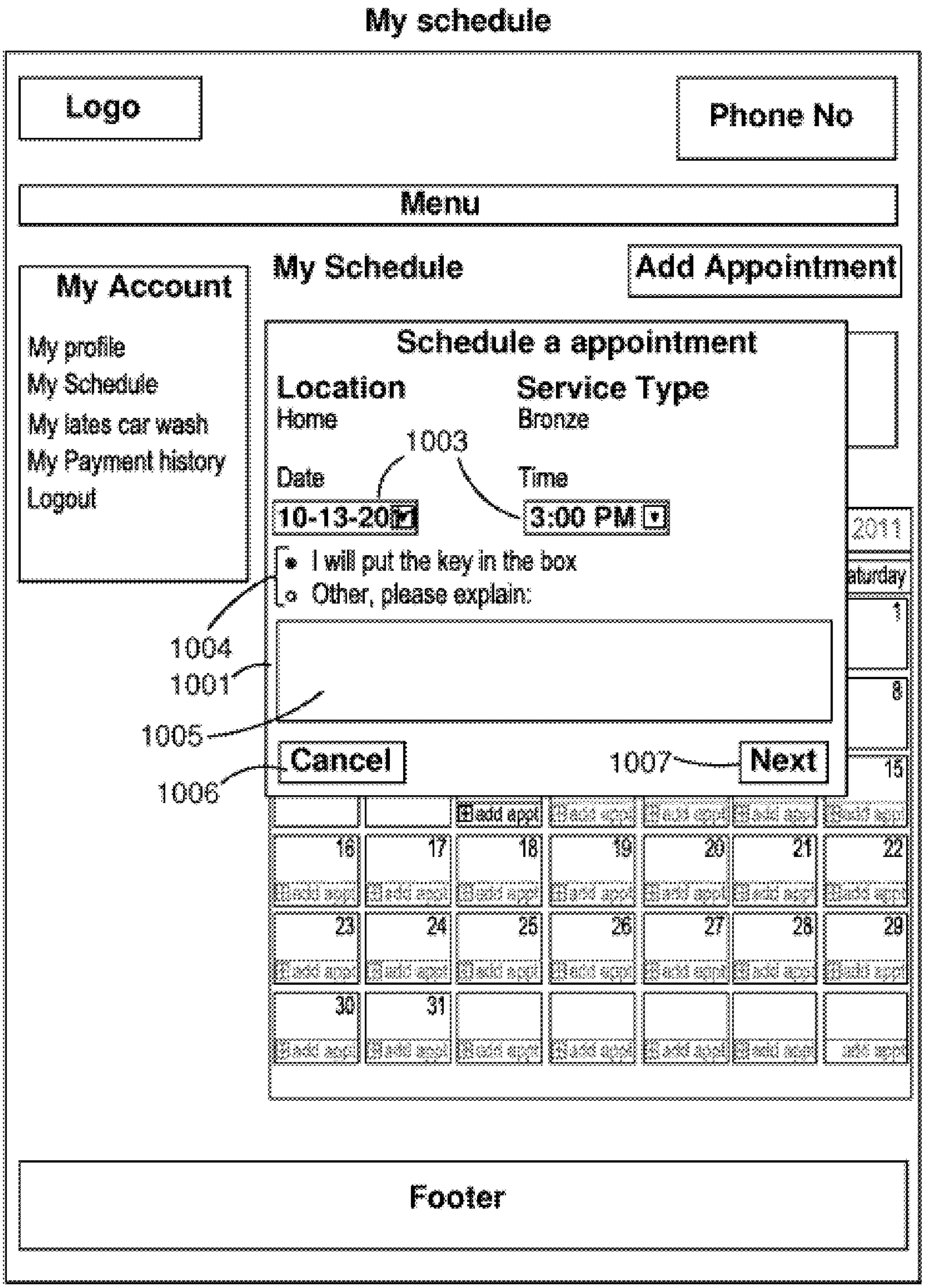
FIG. 30 shows a user's Booking Schedule screen.

A button 806 is provided to cancel any incorrect entries. A Next button 807 is provided to advance the individual to the next stage which shows a Summary of the services requested. This is shown in FIG. 29. A footer area 808 is provided as in previous examples. The screen display shown in FIG. 29 is very similar to the screen display shown in FIG. 27 and areas common have not been referred to again. In the display in FIG. 15 there is an area 901 that shows the location for the service to be performed and the type of service selected, as well as a calendar area 902 showing the date for the required service.

The screen display of FIG. 16 shows an overlay area 1001 overlayed over the screen display of FIG. 23. Here, the location and service type have been repeated. A date and time adjustment area 1003 is provided so the individual can book the date and time for the service. An area 1004 is shown to indicate that the individual will put the key in the secure repository which in this case is a box as some convenient secure location such as at the concierge desk or at an area within the building where the services are to be performed.

An "other" selection is provided to enter data concerning an alternative location where the keys will be left. The individual can enter text in area 1005 to explain the location. A cancel button 1006 is provided to permit the schedule appointment to be cancelled. A next button 1007 is provided to advance the user to the next screen. Here, there is an overlay area 1101 which overlays the screen display of FIG. 29. Here, further information is provided confirming the particular appointment; and that the user individual has agreed to put the key in required repository. A total price for performing the service is also shown. A "back" button 1102 is provided to allow the user to back track to make adjustments to the booking such as to the date and or time for the service. A confirmation button 1103 is provided to enable the user individual to confirm the actual service booking appointment.

Figure 31:
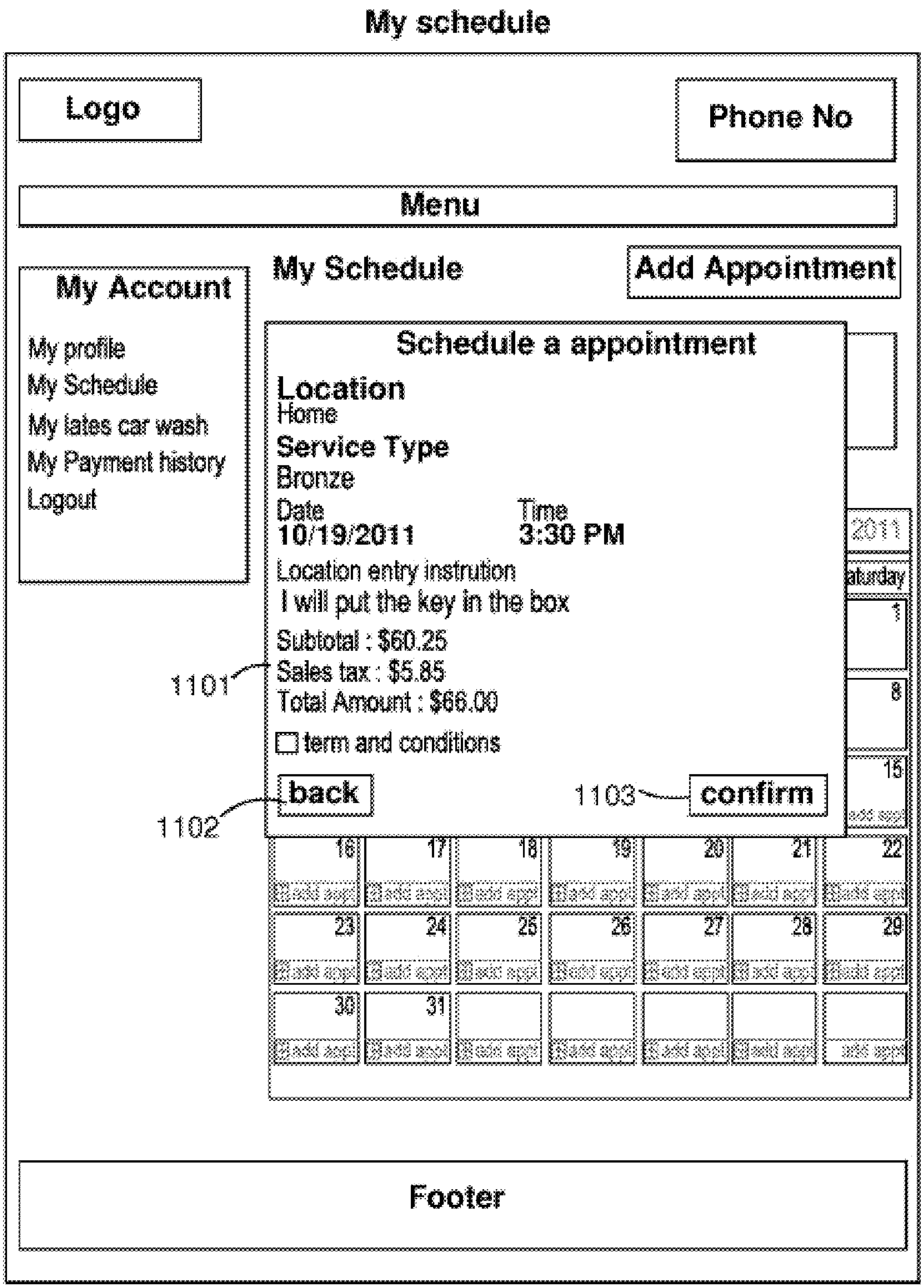
FIG. 31 shows a user's Schedule Summary page for charging.
Figure 32:
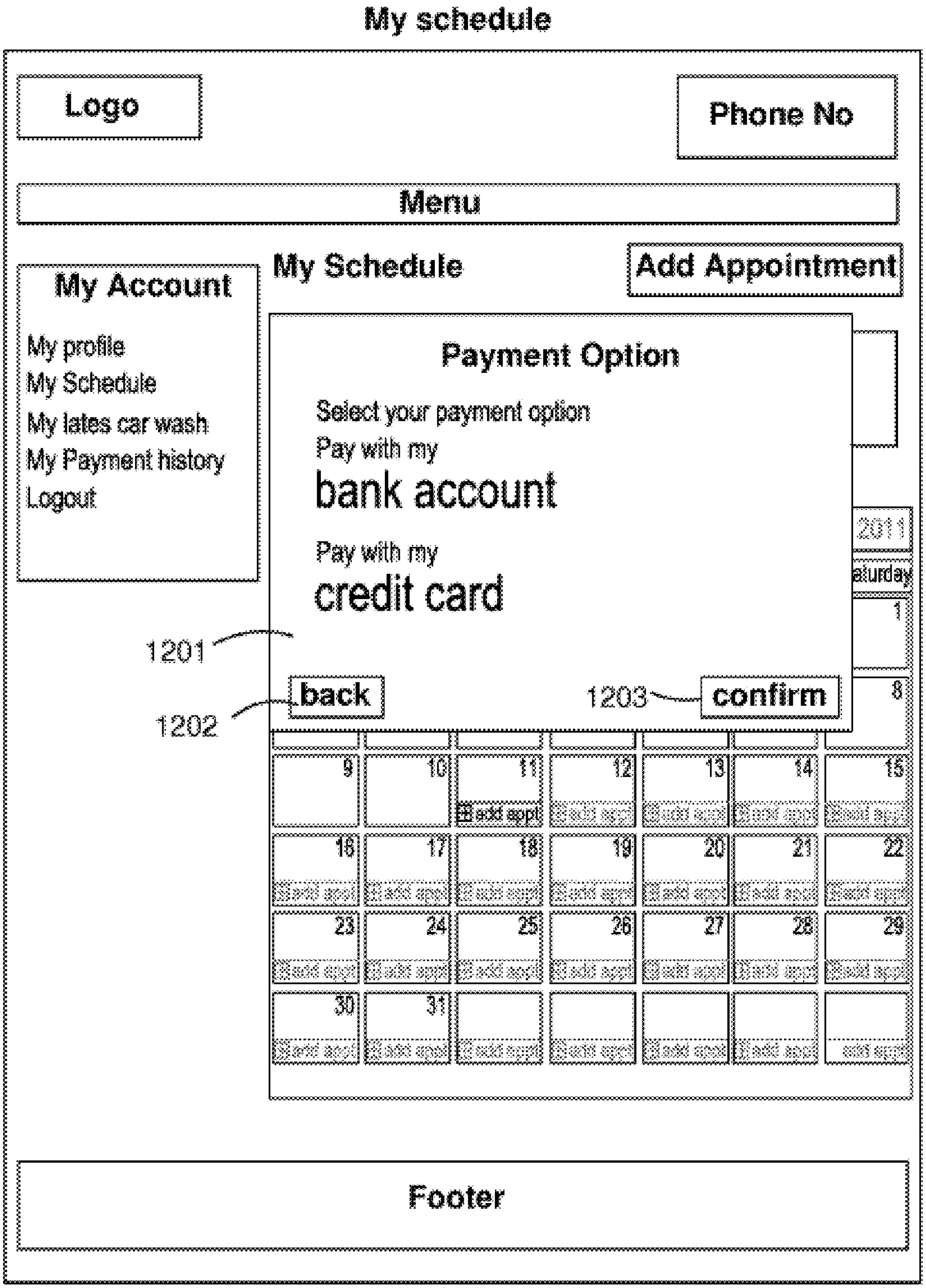
FIG. 32 shows a user's Payment Option screen.

FIG. 32 shows a further screen display which is an overlay over the screen display of FIG. 27 with an area 1201 displaying payment type being either a bank account or credit card. These are not exhaustive and other means of payment may be shown. A Back button 1202 is provided to return the user to the screen displays shown in FIG. 31. A Confirm button 1203 is provided to allow the user individual to actually confirm the booking and the payment and to record the data with the banking server 135 and with the database 125.

Figure 33:
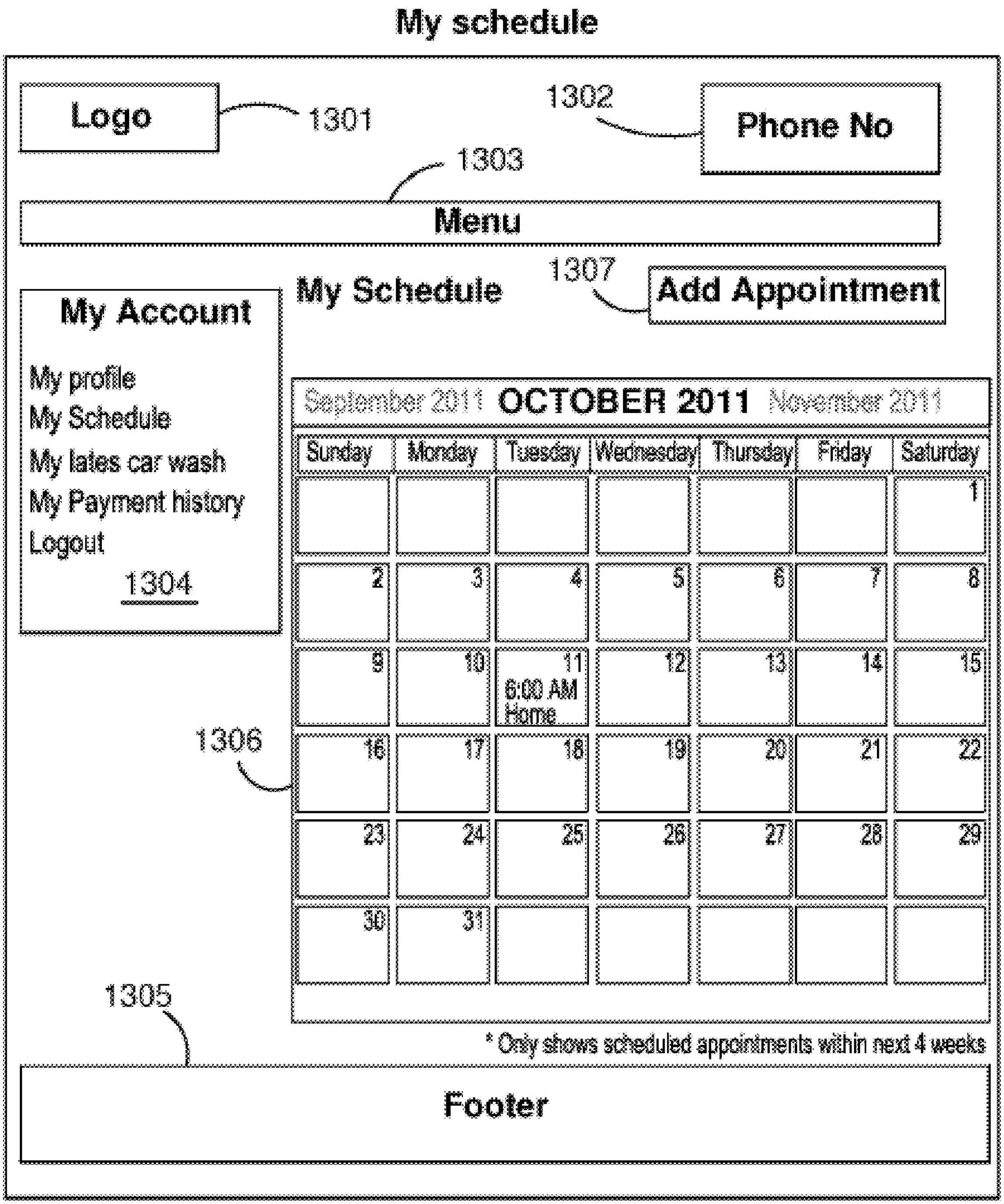
FIG. 33 shows a user's Booking Schedule screen following payment.

The screen display in FIG. 33 shows areas 1301, 1302, 1303 and 1304 as per previous screen displays. In addition, a footer area 1305 is provided as in previous screen displays. An area 1306 is provided which shows a calendar with an actual booking made for 11 Oct. 2011 at 8 am at the individual's home. An add Appointment button 1307 is also provided to allow the addition of further appointments/bookings.

Figure 34:
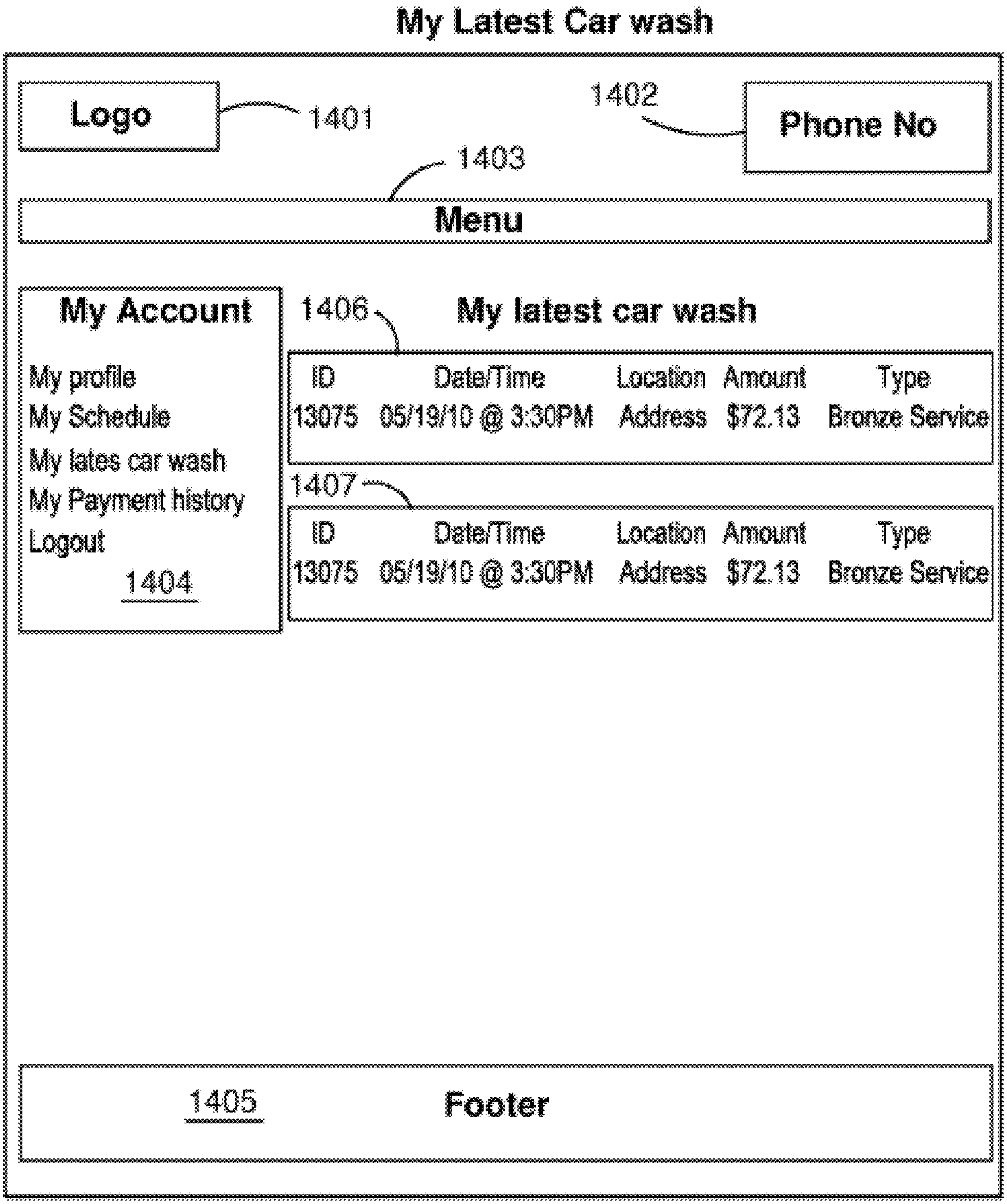
FIG. 34 shows a Summary of User Booked Schedules in a different format to that in FIG. 33.

FIG. 34 shows a screen display with a summary of the latest booking. Here, the display has areas 1401, 1402, 1403, 1404 and 1405 as per previous screen displays. There are further areas 1406 and 1407 to display bookings made. In the present case, the display in areas 1406 and 1407 are identical because there are no multiple bookings made for that period. If the user individual had made multiple bookings then these would appear in respective areas 1406 and 1407 chronologically. There may be further areas similar to areas 1406 and 1407 to accommodate for multiple car washes particularly if the user has multiple cars.

Figure 35:
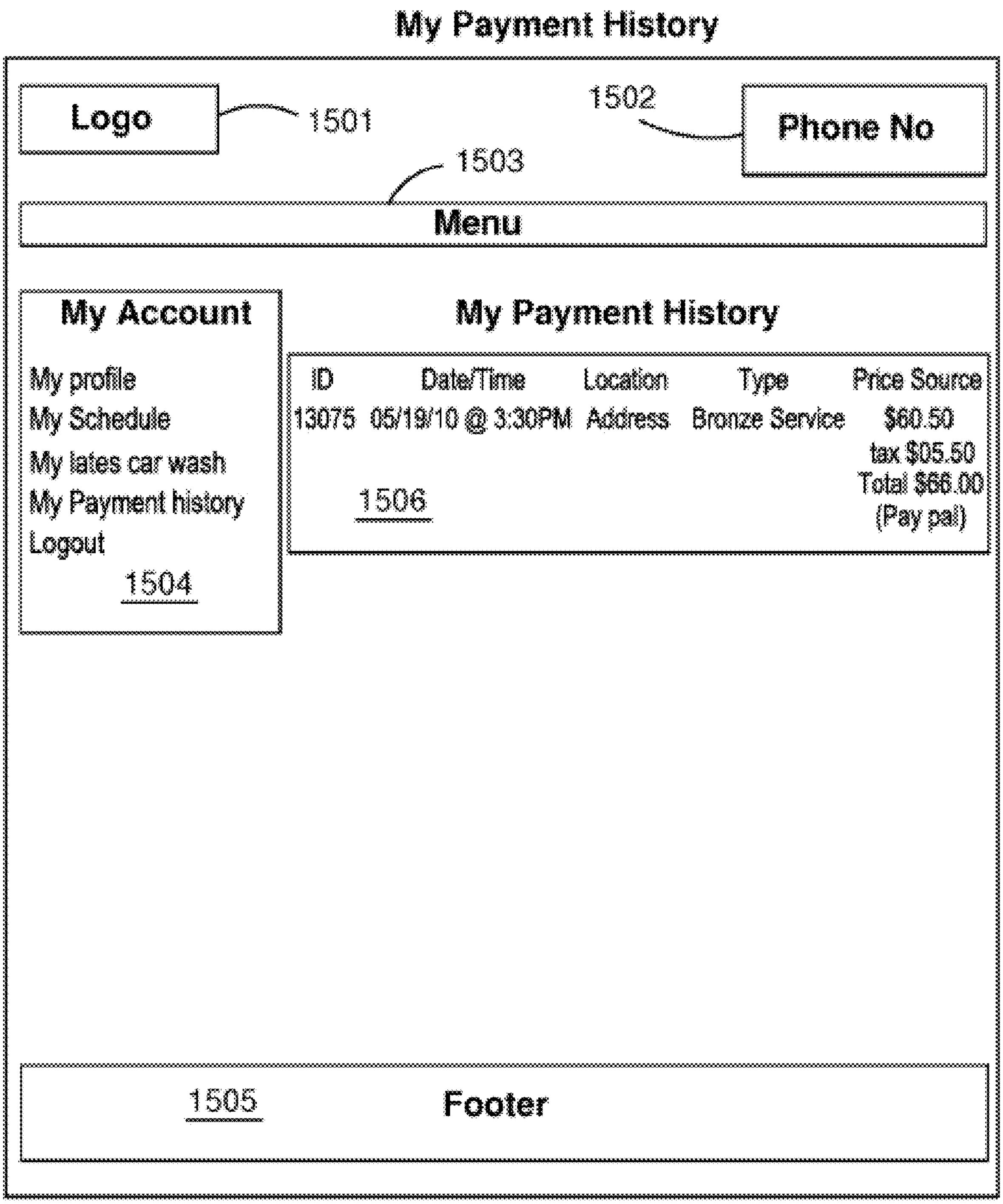
FIG. 35 shows a My Payment History screen.

The Screen display shown in FIG. 35 has areas 1501, 1502, 1503, 1504 and 1505 as per previous screen displays. It has a further area 1506 that shows a Payment History. Only one payment item has been shown however, multiple items may appear. A scrolling button (not shown) may be provided to enable the user individual to negotiate through multiple previous payments. It is noted that the user ID is also shown confirming the booking was for that particular individual.

It should be appreciated therefore that the above described system enables a user individual, being an owner or tenant in a residential apartment building, to book services such as car wash and/or car cleaning services and related services for a time when it is convenient to them. The system enables the user individual to specify the type of cleaning or other service required. It permits the user individual to select a time for the service to be performed. This may be during peak hours or non-peak hours which may be suitably designated by the service providing entity and which may comprise, for example, a peak time from between 9 am to 5 μm and an off peak time from 5 μm to 12 am.

The system enables the service personnel to inform the user via a telephone service such as an SMS service that the requested service has been completed. The car may have been returned to the normal car spot position in the building car park or other location so the user merely has to retrieve the car keys from the user's letter box or other place of security, such as with the concierge.

The system also enables payments to be made to the entity such as the body corporate based on predetermined conditions. These may comprise payments for leasing the space where the service is performed, payments for use of the system by the individuals, payments to charities and the like. The payments may be calculated based on the number of service bookings associated with the entity. The system may also provide for a premium payment to be made to the entity for individuals who have used the method for the first time or for two or more times over a predetermined time period. The predetermined conditions may also comprise a reduced payment taking into account consumables used to perform the service. The reduced payment pay also operate in relation to a service performed in an off peak time period and an increased payment for services perform in a peak time period. The payment may be made to the entity at the time of the payment being made by the individual user, or at some later time period such as daily, weekly, monthly, quarterly etc. The payment is also made according to predetermined criteria which may comprise a number of services performed for the entity user individuals over a predetermined time period and the total payment to the entity is then calculated as a percentage of the payment received for each service provider. The predetermined criteria for payment may include a fixed payment in addition to a percentage of the payment received for each service provided. The fixed fee may comprise a lease payment for space at the entity's premises.

The above system has been implemented for a situation where there is one service organisation providing the service. In this case, the service providing entity will employ the necessary cleaners and train them to the required standard. In variations, the system may be designed so that a number of independent car cleaning organisations may interact with the system. In this case there may be a sharing system to allow each of those cleaning entities to work at different apartment buildings on different days. The system may be set up in a franchise manner with the service providing personnel.

In addition, the system described above does not allow for display of particular booking conflicts that may have arisen due to other individuals in the apartment building requiring a booking at the same time. The software functionality may be altered to permit all bookings on particular day to be displayed so that a user individual attempting to make a booking can see available time slots and choose a particular time on that day or alternatively on a different day.

Additional services may be offered with the car wash service. These could include scratch removable services, paint services, bumper renovation services, alloy wheel renovation services. The examples are not meant to be exhaustive. In addition, other completely different services may be offered.

For example, there may be apartment cleaning services provided. Dry cleaning services may be provided where the user individual will leave clothing items to be cleaned in a laundry bag in their apartment. Instead of depositing car keys into the security repository, the user individual may deposit the apartment key. In this way, the service personnel can enter the individual's apartment and collect the laundry and then return the apartment key in a manner similar to that disclosed for the car wash service.

Other services that are possible include takeaway food ordering, grocery ordering, limousine hiring/ordering, massage ordering, blow wave ordering, flowers, step by step instructions for certain activities such as tax returns. All such non exhaustive possible services are deemed within the scope of the present invention.

Modifications can be made to the invention as would be apparent to the person skilled in the art for providing services. In addition, the functionality of the screen displays may be altered to relevant software and banking detail requirements. The example described is only one of many possible alternatives. These and other modification may be made to the invention the nature of which is to be determined from the forgoing description.

Interpretation

In the context of this document, the term "bus" and its derivatives should be construed broadly as a system for communicating data.

As described herein, a method involving implementation of one or more steps by devices or computing devices should not necessarily be inferred as being performed by a single device such that the one or more steps of the method can be performed by more than one cooperating devices.

Objects such as 'web server', 'server', 'device', 'computing device', 'computer readable medium' and the like should not necessarily be construed as being a single object, and can be implemented as a two or more objects in cooperation, such as, for example, a web server being construed as two or more web servers in a server farm cooperating to achieve a desired goal or a computer readable medium being distributed in a composite manner, such as program code being provided on a compact disk activatable by a license key downloadable from a computer network.

In the context of this document, the term "database" and its derivatives can be used to describe a single database, a set of databases, a system of databases or the like. The system of databases can comprise a set of databases wherein the set of databases can be stored on a single implementation or span across multiple implementations. The term "database" is also not limited to refer to a certain database format rather can refer to any database format. For example, database formats can include MySQL, MySQLi, XML or the like.

The invention can be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives can be used to describe circuits, devices, systems, methods, techniques, communications channels, etc., that can communicate data through the use of modulated electromagnetic radiation through a non-solid medium. The term does not imply that the associated devices do not contain any wires, although in some embodiments they might not. In the context of this document, the term "wired" and its derivatives can be used to describe circuits, devices, systems, methods, techniques, communications channels, etc., that can communicate data through the use of modulated electromagnetic radiation through a solid medium. The term does not imply that the associated devices are coupled by electrically conductive wires.

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" can refer to any device or portion of a device that processes electronic data, e.g., from registers and/or memory to transform that electronic data into other electronic data that, e.g., can be stored in registers and/or memory. The register can be considered as part of memory. A "computer" or a "computing device" or a "computing machine" or a "computing platform" can include one or more processors.

One or more processors operate as a standalone device or can be connected, e.g., networked to other processor(s), in a networked deployment, the one or more processors can operate in the capacity of a server or a client machine in server-client network environment, or as a peer machine in a peer-to-peer or distributed network environment. The one or more processors can form a web appliance, a network router, switch or bridge, or any machine capable of executing a set of instructions (sequential or otherwise) that specify actions to be taken by that machine.

Note that while a Figure can only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

It will be understood that steps of methods discussed can be performed by an appropriate processor (or processors) of a processing (i.e., computer) system executing instructions (computer-readable code) stored in storage. It will also be understood that the invention is not limited to any particular implementation or programming technique and that the invention can be implemented using any appropriate techniques for implementing the functionality described herein. The invention is not limited to any particular programming language or operating system.

Some elements of methods described herein can be implemented by a processor or a processor device, computer system, or by other means of carrying out the function. Thus, a processor with the necessary instructions for carrying out such a method or element of a method forms a means for carrying out the method or element of a method.

It is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which can be a path including other devices or means. "Connected" can mean that two or more elements are either in direct physical or electrical contact, or that two or more elements are not in direct contact with each other but yet still co-operate or interact with each other.

Particular features, structures or characteristics or characteristics can be combined in any suitable manner, as would be apparent to one of ordinary skill in the art from this disclosure, in one or more embodiments/arrangements.

It should be appreciated that in the above description of example embodiments/arrangements of the invention, various features of the invention are sometimes grouped together in a single embodiment/arrangement, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment/arrangement. Thus, the claims following the Detailed Description are hereby expressly incorporated into this Detailed Description, with each claim standing on its own as a separate embodiment/arrangement of this invention.

Furthermore, while some embodiments/arrangements described herein can include some but not other features included in other embodiments/arrangements, combinations of features of different embodiments/arrangements are meant to be within the scope of the invention, and form different embodiments/arrangements, as would be understood by those in the art. For example, in the following claims, any of the claimed embodiments/arrangements can be used in any combination.

In the description provided herein, numerous specific details are set forth. However, it is understood that embodiments of the invention can be practiced without these specific details. In other instances, well-known methods, structures and techniques have not been shown in detail in order not to obscure an understanding of this description.

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Unless otherwise specified the use herein of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims which follow and in the preceding description of the invention, except where the context requires otherwise due to express language or necessary implication, the word “comprise” or variations such as “comprises” or “comprising” are used in an inclusive sense, i.e. to specify the presence of the stated features but not to preclude the presence or addition of further features in various embodiments of the invention.

Any one of the terms: “including” or “which includes” or “that includes” as used herein is also an open term that also means “including at least” the elements/features that follow the term, but not excluding others. Thus, including is synonymous with and means comprising.

While there has been described suitable arrangements of the invention, those skilled in the art will recognize that other and further modifications can be made thereto without departing from the spirit of the invention, and it is intended to claim all such changes and modifications as fall within the scope of the invention. Functionality can be added or deleted from the block diagrams and operations can be interchanged among functional blocks. Steps can be added or deleted to methods described within the scope of the present invention.

Although the invention has been described with reference to specific examples, it will be appreciated by those skilled in the art that the invention can be embodied in many other forms.

The invention claimed is:

1. A key access system for selectively providing access to first and second keys or sets of keys, the system comprising:

a. a key safe including:
   i. a key safe door which when opened enables access into the safe;
   ii. a primary lock for locking or unlocking the key safe door;
   iii. at least first and second key compartments for containing the first and second keys or sets of keys, and wherein each of said at least first and second key compartments includes a lockable compartment closure for selectively providing access to the compartment, wherein the lockable compartment closures each include a closable internal door within the key safe;

b. a remote communications module for sending and receiving data from remote locations by a telecommunication system including a starting access clock register for registering a defined starting time for access;

c. a localised communications module for sending and receiving data to and from external nearby wireless communications devices;

d. a request clock register for registering a time that access is requested to the localised communications module by the external nearby wireless communications devices;

e. a determinator for assessing or receiving data that selectively determines fulfilment of one or more of the predetermined access criteria including of:
   i. selected compartment from the at least first and second key compartments; and
   ii. within the allowed timing of the request clock register from the starting access clock register;

f. wherein the system provides first and second keys or sets of keys and provides separate controlled access to the first and second keys or sets of keys at sequential non-overlapping controlled times to different users using the same key access system and the request clock register wherein controlled access includes:

i. the system supporting multiple users of a single apartment without the need for multiple keys;
   ii. schedule by controlling primary and secondary access;
   iii. a physical key is only accessible in a defined period and its return is identified and controlled, wherein the start of the access is defined and the end of the access is confirmed;

wherein the controlled times are continuous non overlapping time periods;

a. a plurality of compartment closures adapted to receive a digital key and a time access key from a service provider to allow opening of a predetermined one of the plurality of the multiple compartments for access to one of the first and second keys or sets of keys during the allowed time limited operation of a digital lock associated with the one of the plurality of the multiple compartments; and b. a generator adapted to create the digital lock each time it is in use so that access is available to multiple users;
   i. wherein the digital lock is operable by multiple requirements of a keycode and a timecode with reference to the request clock register from the starting access clock register; and
   ii. wherein operative receipt of the digital key and the time access key within the allowed time with reference to the request clock register allows for opening of the primary lock of the key safe door and the predetermined first and second key compartments for access to the first and second keys or sets of keys.

2. The key access system of claim 1 wherein the nearby wireless communications devices includes a key fob.

3. The key access system of claim 1 wherein the nearby wireless communications devices includes RFID.

4. The key access system of claim 1 wherein the lockable compartment closure of the key safe further includes a secondary lock separate to the primary lock of the key safe door.

5. The key access system of claim 4 wherein the secondary lock is related to an access code of the primary lock.

6. The key access system of claim 4 wherein the primary lock includes a plurality of available access codes and the plurality of secondary locks are respectively related to only one of the access code of the primary lock, wherein the localised communications module for sending and receiving data to and from the external nearby wireless communications devices will open the primary lock and thereby the key safe door and one only of the secondary locks and thereby will open one only of the at least first and second key compartments.

7. The key access system of claim 1 wherein the localised communications module includes a sensor for receiving data from the external nearby wireless communications devices of a first user whereby the predetermined access criteria determines it is a first user and provides access to the key safe and each of the at least first and second key compartments.

8. The key access system of claim 1 wherein the localised communications module includes sensor for receiving data to and from the external nearby wireless communications devices of a secondary user whereby the predetermined access criteria determines it is a secondary user and if within the allowed time provides access to the key safe and one only of the at least first and second key compartments.

9. The key access system of claim 1 wherein the telecommunication system includes the internet.

* * * * *